Dec. 7, 1965   L. C. POOLE   3,222,589
ELECTRICAL CONTROL SYSTEM FOR WELDING APPARATUS
Original Filed March 10, 1951   5 Sheets-Sheet 1

INVENTOR.
Lloyd C. Poole.
BY John L. Stoughton
his ATTORNEY.

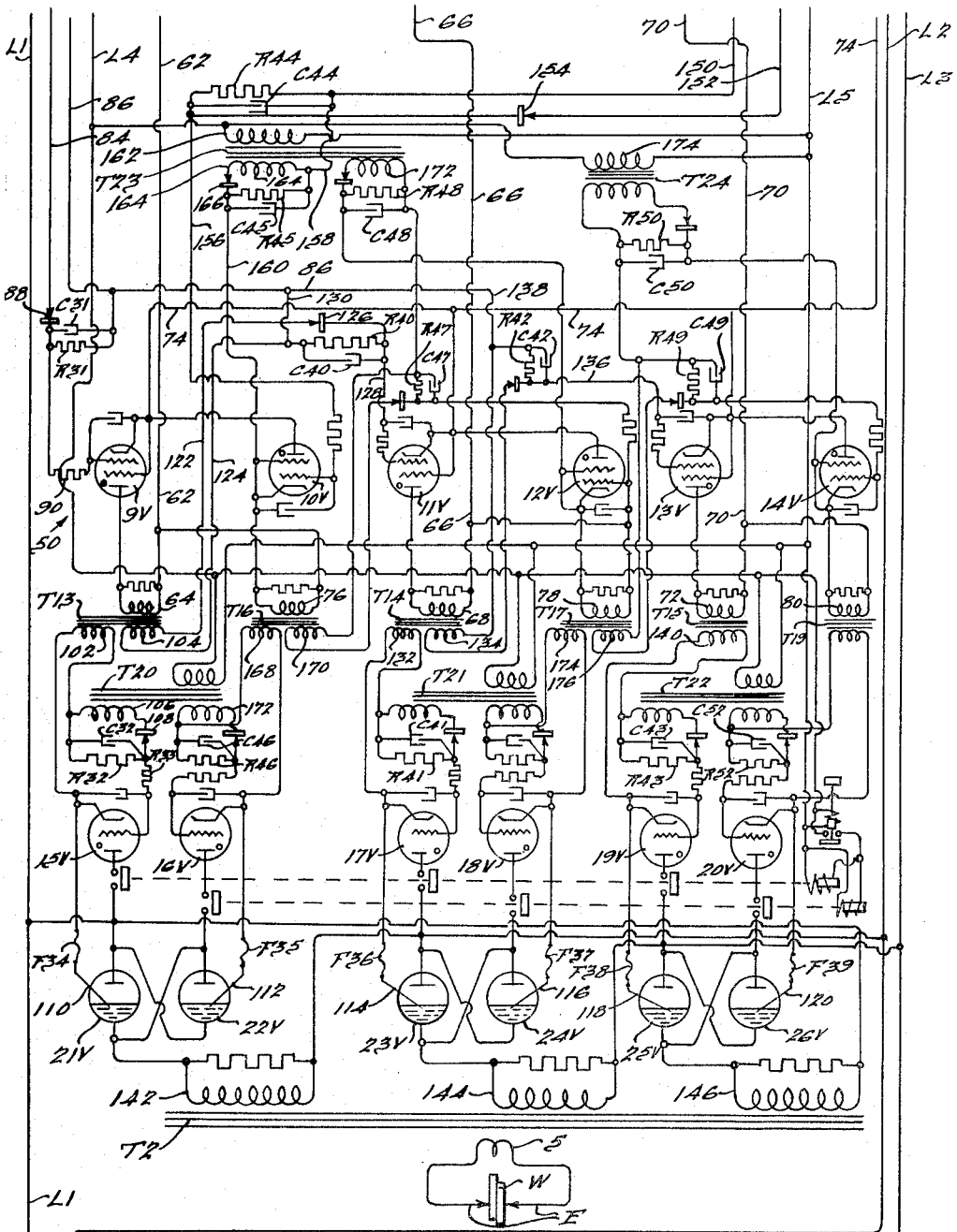

INVENTOR.
Lloyd C. Poole.
BY John L. Stoughton
his ATTORNEY.

Dec. 7, 1965 L. C. POOLE 3,222,589
ELECTRICAL CONTROL SYSTEM FOR WELDING APPARATUS
Original Filed March 10, 1951 5 Sheets-Sheet 5

INVENTOR
Lloyd C. Poole.
BY John L. Stoughton
his ATTORNEY.

United States Patent Office 3,222,589
Patented Dec. 7, 1965

3,222,589
ELECTRICAL CONTROL SYSTEM FOR
WELDING APPARATUS
Lloyd C. Poole, 310 E. Lewiston Ave., Ferndale 20, Mich.
Continuation of application Ser. No. 214,999, Mar. 10,
1951. This application Mar. 14, 1956, Ser. No. 576,512
52 Claims. (Cl. 321—7)

This application is a continuation of my copending application Serial No. 214,999, filed March 10, 1951, for Electrical Control System, now abandoned.

This invention relates generally to electrical control systems and is particularly adapted among other uses for controlling the flow of electrical energy from a source of potential of one frequency to a load requiring a potential of a different frequency.

An object of this invention is to provide a new and improved apparatus of the character described.

A further object of this invention is to provide apparatus for transferring electrical energy from a source of one frequency to a load requiring a second frequency.

Another object of this invention is to provide an improved apparatus for controlling the flow of energy from a polyphase source to a single phase load.

Another object is to provide such an apparatus wherein the frequency of potential supplied to the load is substantially less than that of the source.

Another object is to provide in such an apparatus a pulsating device which will maintain the desired load frequency.

Another object is to provide in such a pulsation control means for synchronizing the means for locking the pulsating apparatus in step with the alternations of the source.

Another object is to provide an improved apparatus for supplying a single phase heating current at a low frequency from a polyphase source at a higher frequency whereby the load is substantially equally divided between the source phases.

Another object of this invention is to provide such an apparatus in which the pulsating apparatus may be controlled to provide for different frequencies of the voltage being supplied to the load.

Another object of this invention is to provide such an apparatus in which asymmetric current flow devices are connected between each phase of source and load and are connected for sequential operation upon initiation of one of the asymmetric devices from the pulsing source.

Figure 1A:
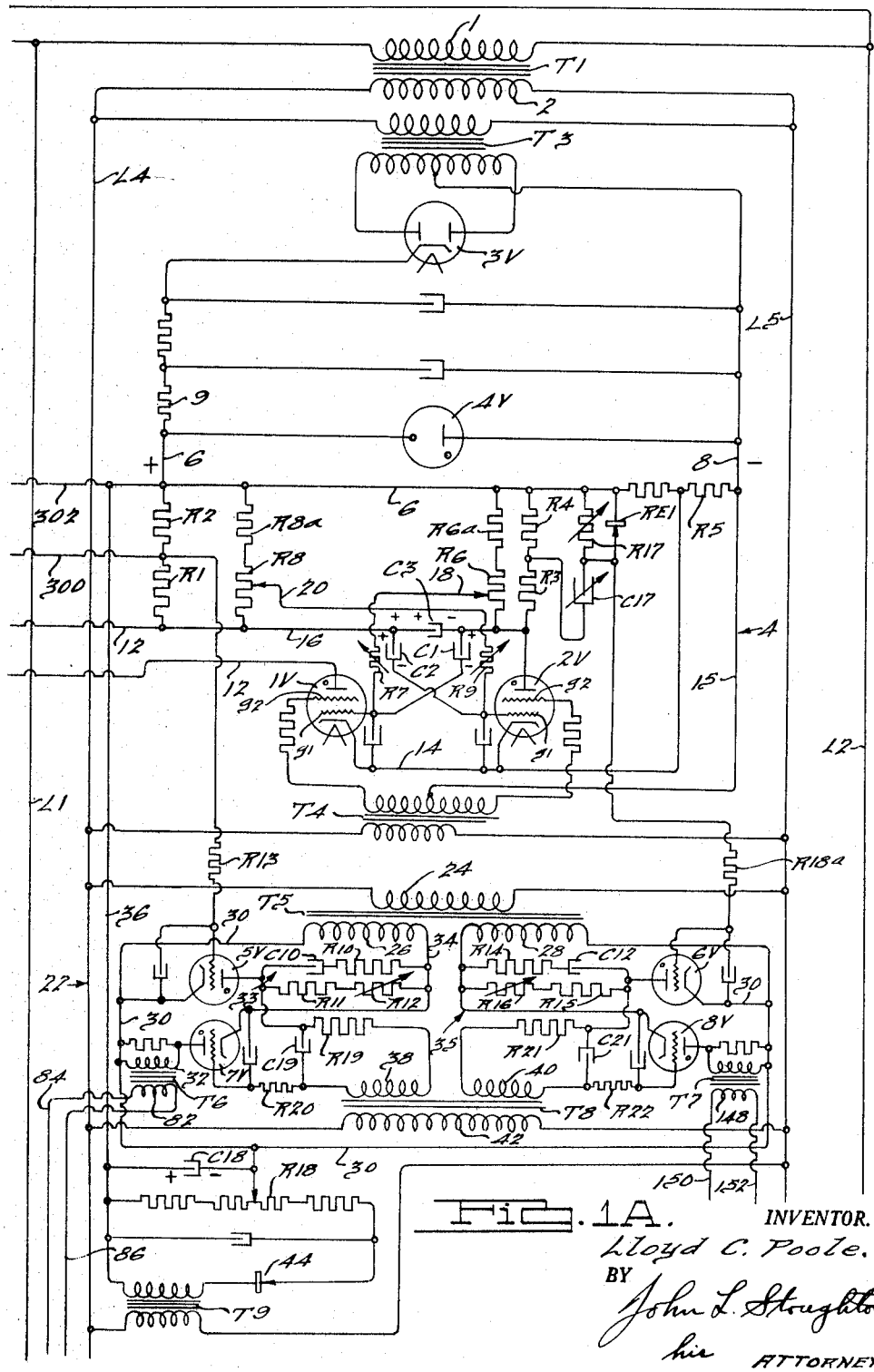
Figure 1B:
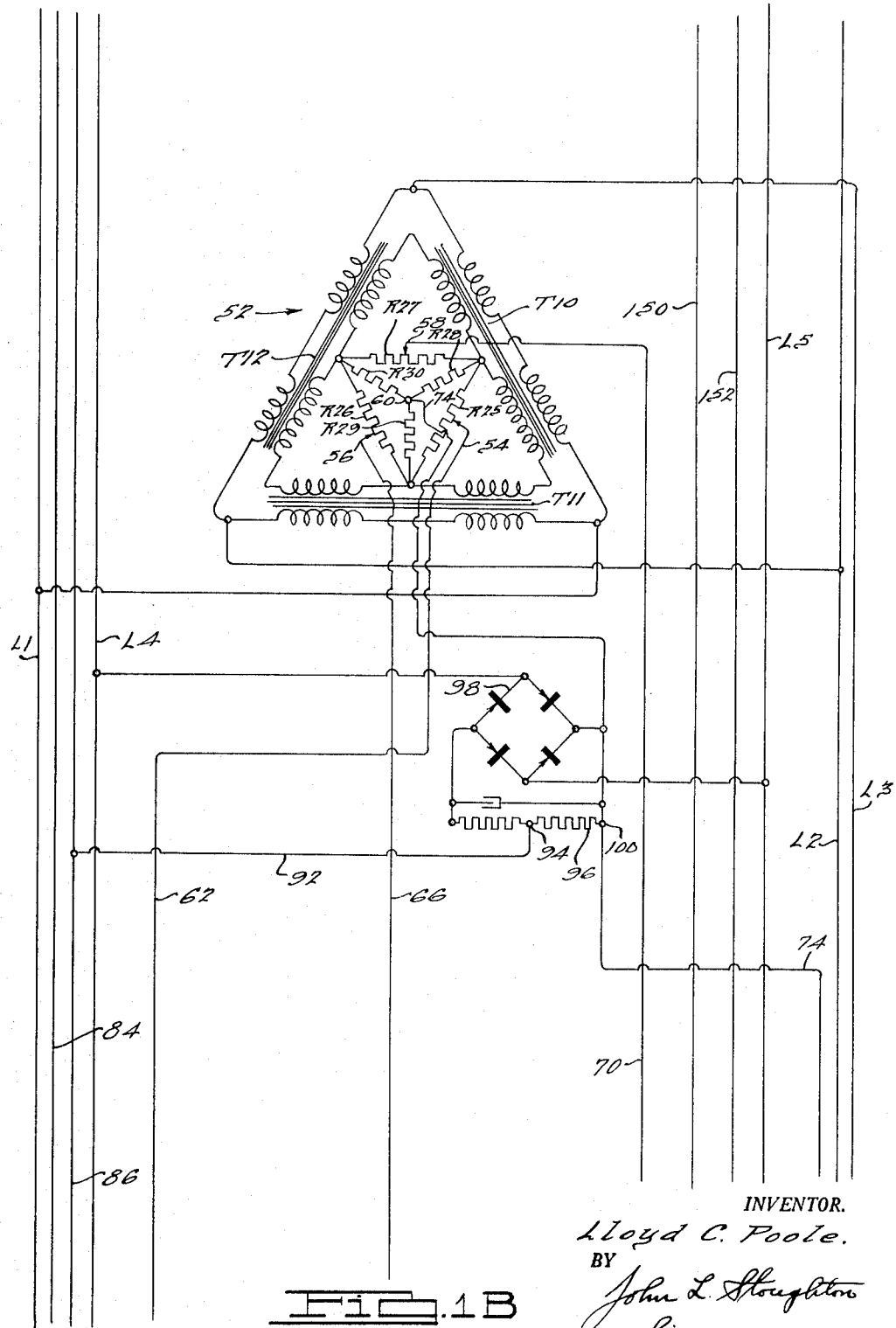
Figure 2:
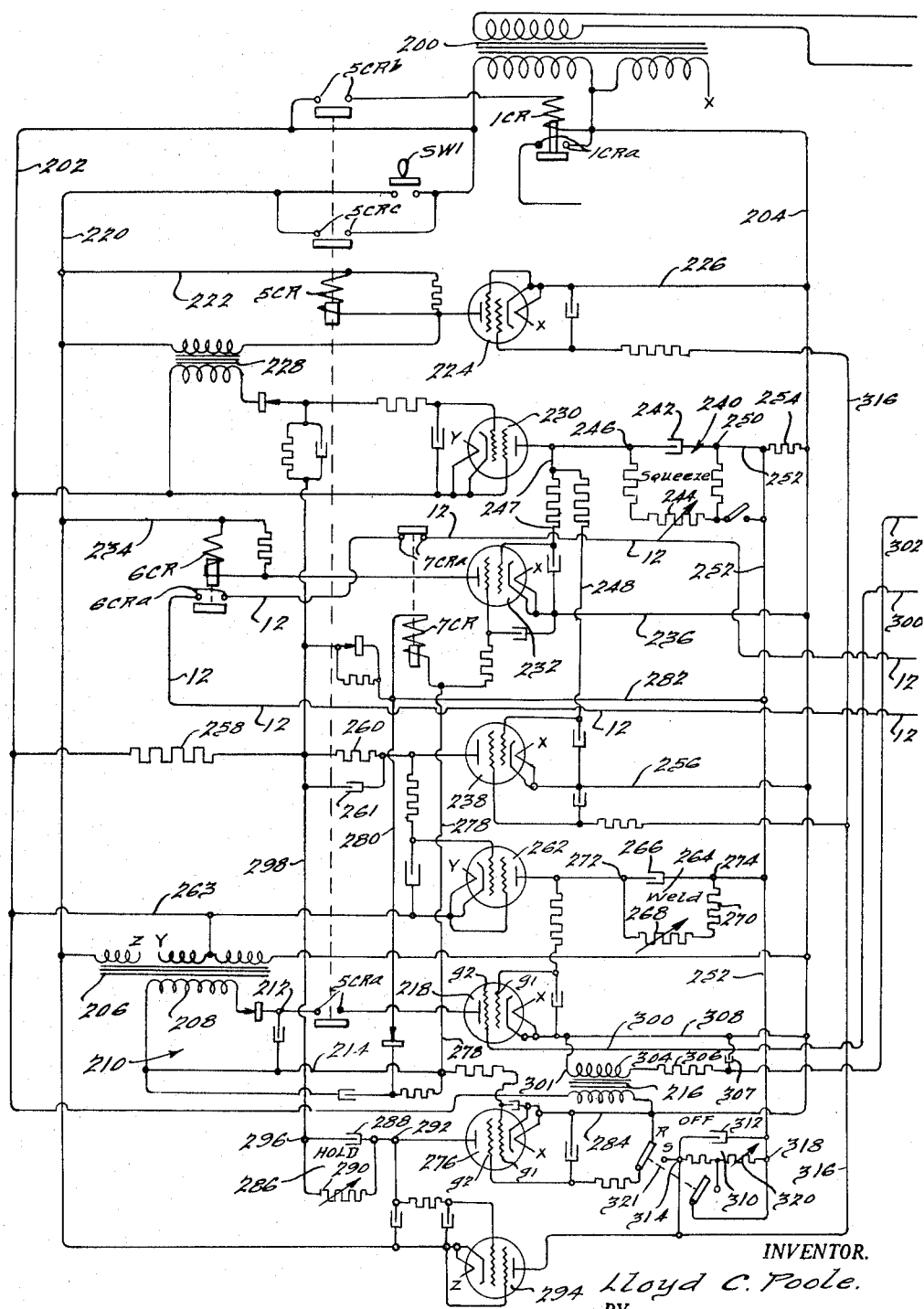
Figure 7:
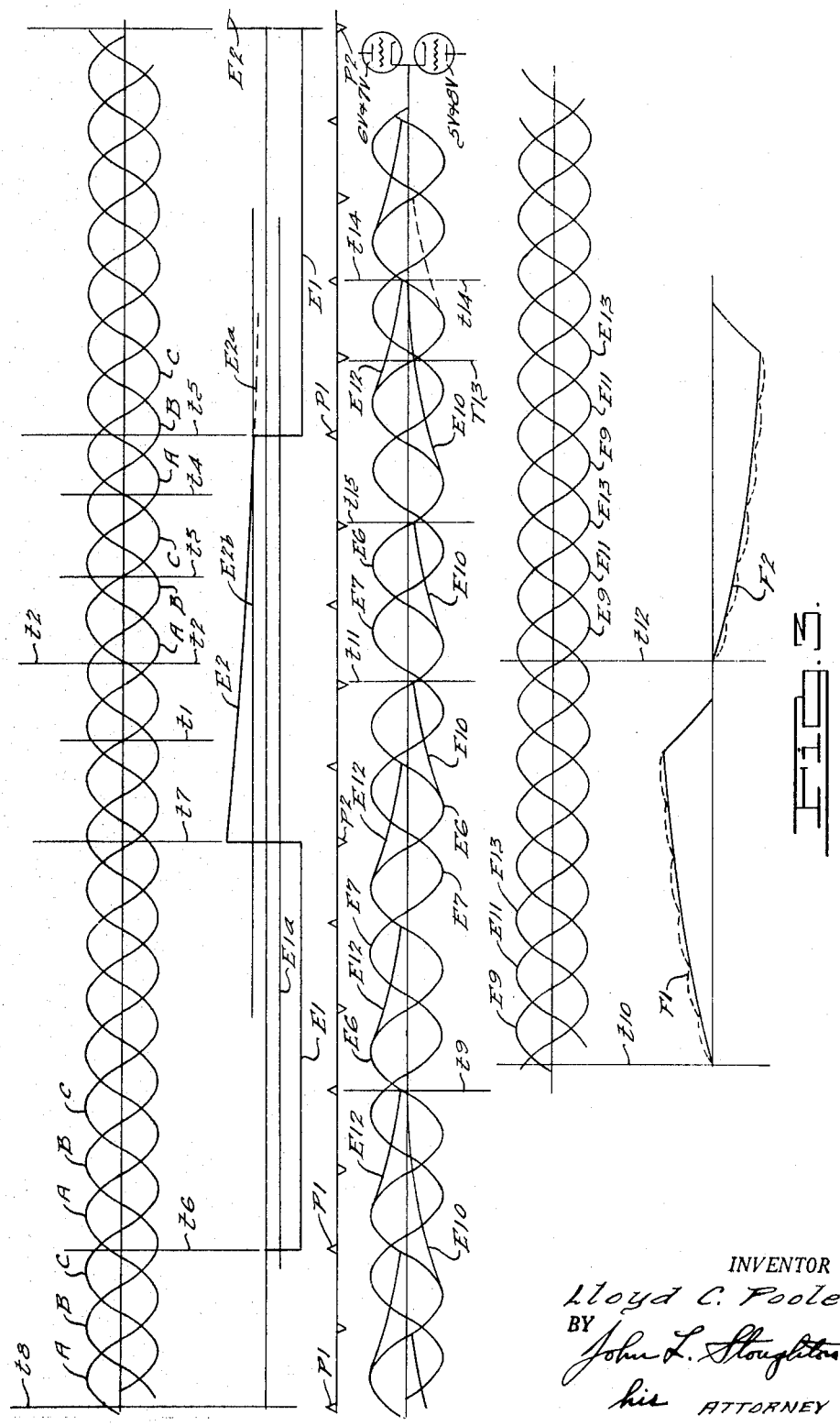

Other objects will be apparent upon a reading of the specification, the appended claims and from the drawings in which drawings:

FIGURES 1A, 1B and 1C, when arranged in end-to-end relation in the order named, will present a diagrammatic illustration of an apparatus for supplying single phase welding current from a source of alternating polyphase potential;

FIG. 2 is a schematic view of a sequencing control for use with the apparatus of FIGS. 1A through 1C and when placed at the left side of FIG. 1A will indicate the interconnections between the sequencing circuit and the power supplying circuit; and FIG. 3 is a schematic view of certain electrical relationships of the invention.

Generically the invention provides a first network 4 having a pair of pulsating voltage producing devices 1V and 2V pulsating at the desired load frequency and which devices 1V and 2V are interconnected with the source frequency by the transformer T4 to initiate the pulses in a desired phase relationship with the voltage wave of the alternating source. These pulsations from the first controlling network 4 initiate operation of a second controlling network 22 which in turn controls a third network 50 (FIG. 1C) which initiates the conductivity of asymmetric current conducting means 21V–26V connected between each phase of the source and the load (electrodes E) for controlling the duration of and the direction of the current flow from the source to the load. The anode potential of the valves 9V–14V of the third controlling network 50 is supplied from a phase shifting network 52 whereby the time of conducting of the controlling valve of the third network 50 with respect to the voltage wave applied to the main load current controlling valves may be controlled to regulate the energy delivered to the work W.

Referring more specifically to the drawings by characters of reference and FIG. 1A in particular, the reference characters L1 and L2 indicate two conductors of a source of three phase current having the conductors L1, L2 and L3. A transformer T1 for supplying control voltage has its primary winding 1 connected between the lines L1 and L2 and a secondary winding 2 connected to supply an electrical potential between a pair of conductors L4 and L5 whereby the frequency of the alternating current potential between the lines L4 and L5 will be the same as that of the source potential and at a fixed phase relationship therewith.

The numeral 4 indicates generally the multi-vibrator frequency controlling network which comprises the discontinuous grid control valves 1V and 2V. The anode circuit of the valve 1V during standby periods is normally open and that of the valve 2V is closed so that the valve 2V normally conducts. During operating periods the valves 1V and 2V alternately conduct to cause energy to be supplied from the lines L1, L2 and L3 though the welding transformer T2 (FIG. 1C) and its single phase secondary winding 5 to a pair of welding electrodes E having clamped therebetween a pair of workpieces W which are to be welded together.

Anode current for the valves 1V and 2V is supplied by a pair of direct current busses 6 and 8 which are energized through a rectifier valve 3V from a transformer T3 having its primary winding connected between the conductors L4 and L5. The voltage between the busses 6 and 8 is maintained substantially constant by means of the series resistor 9 and glow tube 4V. The anode of valve 1V is connected by means of conductor 12 through the normally open contacts 6CRa of the relay 6CR and normally closed contacts 7CRa of the relay 7CR both shown in FIG. 2 and through series connected resistors R1 and R2 to the bus 6. The anode of the valve 2V is connected through a pair of series connected resistors R3 and R4 to the positive bus 6. The cathodes of the valves 1V and 2V are each connected to the common conductor 14 which is connected to the negative bus 8 through a resistor R5. The resistor R5 acts to maintain the potential of the cathodes of the valves 1V and 2V slightly above the potential of the negative bus 8 which is connected by conductor 15 through transformer T4 to the grids $g2$ of the valves 1V and 2V to normally hold these grids at a potential to block initiation of current flow through their respective valves.

The other of the control grids $g1$ of the valve 1V is connected to one terminal of a capacitor C1, the other terminal of which is connected to the anode of 2V. Similarly the grid $g1$ of the valve 2V is connected to one terminal of capacitor C2, the other terminal of which is connected to the conductor 16 which connects to the conductor 12 intermediate the resistor R1 and the contacts 7CRa. A pair of series connected resistors R6 and R6a are connected in parallel with the series connected resistors R3 and R4. The resistor R6 is provided with an adjustable contact or tap 18 connected through a variable resistor R7 to the terminal of the capacitor C1 which is connected to the grid $g1$ of the valve 1V to provide a controlled discharge path therefor. The rate of discharge of the capacitor C1 and consequently the off time interval of valve 1V is primarily controlled by the magnitude of the resistance of resistor R7 and the adjustment of the adjustable tap 18 provides a normally positive bias for the grid g1 of valve 1V. Similarly the capacitor C2 has a discharge circuit including resistors R8, R8a and R9, the resistors R8 and R8a being connected in parallel with the series resistors R1 and R2 and an adjustable tap 20 of the resistor R8 connected through the adjustable resistor R9 to the grid g1 of the valve 2V.

In order that the valves 1V and 2V will remain in step with the supply frequency of the lines L1, L2 and L3, an alternating bias potential is placed between the control grids g2 and the cathodes of each of the valves 1V and 2V. This potential is derived from a peaking transformer T4 having a primary winding and a center tapped secondary winding. The primary winding is connected between the lines L4 and L5. The center tap of the secondary winding is connected to the bus 8 by the before-mentioned conductor 15 and through the resistor R5 to the common conductor 14 connected to the cathodes of the valves IV and 2V. The opposite end terminals of the secondary winding is connected through individual grid current limiting resistors to the individual grids g2 of the valves IV and 2V.

The modified multi-vibrator network 4 controls the network 22 comprising valves 5V, 6V, 7V and 8V. The anode potential of the valves 5V through 8V is supplied by a transformer T5 having its primary winding 24 connected between the lines L4 and L5. More specifically, one terminal of one of the secondary windings 26 of transformer T5 is connected by conductor 30 to the cathode of the valve 5V and through the primary winding 32 of a control transformer T6 to the anode of the valve 7V. The anode of valve 5V is connected to a conductor 34 through impedance network 33 comprising a series connected capacitor C10 and resistor R10 and a pair of series connected resistors R11 and R12 connected in parallel with the capacitor C10 and resistor R10. The conductor 34 connects the cathode of valve 7V to the opposite end of the winding 26. The polarity of the voltage supplied to the valves 5V and 7V is such that the anode of the valve 7V is positive with respect to its associated cathode during the same half cycles as the anodes of the valves 9V, 15V and 21V are positive with respect to their associated cathodes. The valve 5V is connected to conduct current during the opposite half cycle of the voltage from that during which the valve 7V is capable of conduction. Similarly, the valves 6V and 8V are connected to the winding 28 through a network 35 which comprises resistors R14, R15 and R16, and capacitor C12 and through a transformer T7. The valve 8V is polarized so that it is capable of conducting current during the same half cycle of voltage as that during which the valve 5V is capable of conducting. The valve 6V is connected to conduct during the same half cycle as is the valve 7V.

The grid to cathode biases for the valves 5V and 6V are supplied from the network 4, that for the valve 5V being a function of the voltage appearing across the resistor R2 and that for the valve 6V being a function of the voltage appearing across an adjustable resistor R17 connected in series with an adjustable capacitor C17. The capacitor C17 and resistor R17 are connected in parallel with the resistor R4. As will be apparent from the drawing, the controlling grid of the valve 5V is connected through a grid current controlling resistor R13 to the common point of the resistors R1 and R2 and the controlling grid of the valve 6V is connected through a grid current controlling resistor R18a to the common point of the resistor R17 and capacitor C17. The cathode of the valve 5V is connected through the conductor 30 and biasing potentiometer R18 to the conductor 36 connected to the common junction of the resistor R2 and the positive bus 6. The cathode of the valve 6V is connected to the conductor 30 and through potentiometer R18 to the bus 6 and therethrough to its connection with the resistor R17.

The potentiometer R18 is supplied with pulsating unidirectional voltage from transformer T9 and rectifier 44 and maintains a charge on the capacitor C18 which is of a polarity to maintain the valves 5V and 6V conductive except when an overriding blocking potential appears across the resistors R2 and R17.

The conductivity of the valves 7V and 8V is controlled by the valves 5V and 6V respectively. The control or grid to cathode bias for the valve 7V is derived from the potential appearing across the network 33 and an alternating bias voltage derived from the transformer T8. More specifically, the anode end of the network 33 is connected through a resistor R19, secondary winding 38 and resistor R20 to the grid of valve 7V. The bias voltage for the valve 8V is similarly derived from the network 35 and transformer T8 through resistors R21 and R22 and secondary winding 40 of the control transformer T8. A capacitor C19 is connected between the common point of resistor R19 and network 33 and resistor R20 and winding 38 while a similar capacitor C21 is connected between the common point of resistor R21 and network 35 and resistor R22 and winding 40. Transformer T8 has its primary winding 42 connected between the lines L4 and L5. The windings 38 and 40 are so phased with respect to the phasing of the windings 26 and 28 and the values of capacitors C19 and C21 and resistors R19 and R21 are so chosen that the alternating grid potentials supplied thereby between the grid and cathode of the valves 7V and 8V will be leading in phase with respect to the potential between the anode and cathode of the respective valves 7V and 8V by an amount which is somewhat less than 180° and preferably in the neighborhood of 150° so that the grid to cathode bias voltage applied by the windings 38 and 40 will bias these valves to blocked condition during all of the period in which their anodes are positive with respect to their cathodes except for a very short interval during the initial portion of such cycle. The valves 7V and 8V can therefore commence to conduct only during the early portion of a positive half cycle.

The third controlling network 50 comprises a series of valves 9V through 14V which control respectively the grid to cathode potential of a series of valves 15V through 20V connected in the starting circuits of the main load current controlling valves 21V through 26V which may be and preferably are Ignitrons. The valves 9V and 10V are rendered conductive in respect to voltage pulses supplied by the transformers T6 and T7 of the second network 22.

The anode to cathode potential of the valves 9V to 14V is supplied from a phase shifting network 52 supplied with three phase energy from the lines L1, L2 and L3 which lines also are connected through the valves 21V to 26V to the transformer T2 for supplying the load current to the work W. Curves A, B, and C of FIG. 3 represent the potentials of the supply lines L1, L2 and L3 respectively and is the voltage applied to valves 21V–26V. The valves 9V, 11V and 13V are arranged to conduct during the positive cycles of the voltage while valves 10V, 12V and 14V are arranged to conduct during the negative half cycles of the applied voltage as shown by curves A, B and C. The network 52 is adjustable to supply a potential to the valves 9V through 14V which is in a desired adjusted phase relationship to the potential supplied to the valves 21V to 26V. The valves 9V and 10V; 11V and 12V; and 13V and 14V are respectively connected back-to-back across the respective output phases of the output voltage of network 52 as represented respectively by the voltage curves E9, E11 and E13 of FIG. 3. The phase of the output voltage of network 52 is adjustable relative to the phase of the voltage of curves A, B, and C so that the valves 21V to 26V may be rendered conductive at the desired point along the wave of voltage being supplied between lines L1, L2 and L3 for the purposes of controlling the amount of energy supplied to the work W. The voltage waves E9, E11, and E13, as shown in FIG. 3, represent the three phase output voltage wave of the network 52; phase shifted with respect to the wave A, B, and C. The valves 9V, 11V and 13V conduct during selective half cycles of the waves E9, E11 and E13, respectively, which are above the neutral line. As shown, the valves 9V, 11V and 13V each conduct during the two upper half cycles of each of the respective waves E9, E11 and E13 which follow time t10. The valves 10V, 12V and 14V conduct during selective half cycles of the waves E9, E11 and E13, respectively, which are below the neutral line. As shown, the valves 10V, 12V and 14V each conduct during the two lower half cycles of the respective waves E9, E11 and E13 which follow the time t12.

The valves 11V and 13V act in trailing relationship to the valve 9V whereby once the valve 9V has become energized the valves 11V and 13V will conduct during the subsequent half cycles of the three phase energy supply subsequent to initial conduction of the valve 9V. Similarly the valves 12V and 14V are arranged in trailing relationship to the valve 10V. In this manner a current pulse is supplied from each of the supply phases each time an impulse is supplied from the networks 4 and 22.

The phase shifting network 52 is in usual form and comprises three transformers T10, T11 and T12 having their primary windings connected in delta between the lines L1, L2 and L3 and having center-tapped secondary windings, the center taps of which are connected to the curves of three delta connected resistors R25, R26 and R27. The resistors R25, R26 and R27 have movable taps 54, 56 and 58 respectively. In order to provide a neutral point for the phase shifted potential which is obtained from the adjustable taps 54, 56 and 58, the center tap of the secondary windings of the transformers are connected together by resistors R28, R29 and R30 in Y connection to provide a neutral point 60.

The tap 54 is connected by means of a conductor 62 to the anode of valve 9V through the primary winding 64 of a transformer T13. The tap 56 is connected by means of conductor 66 to the anode of valve 11V through the primary winding 68 of transformer T14 and the tap 58 is connected by means of conductor 70 to the anode of valve 13V through the primary winding 72 of transformer T15. The cathodes of the valves 9V, 11V and 13V are all connected to a common conductor 74 and therethrough to the neutral point 60 of the phase shifting network 52. Similarly the conductors 62, 66 and 70 are respectively connected through primary windings 76 of transformer T16, 78 of transformer T17, and 80 of transformer T19 to the cathodes of the valves 10V, 12V and 14V respectively. The anodes of each of these valves 10V, 12V and 14V are also connected to the common conductor 74 and thereby to the neutral point 60 of the phase network 52. It may now be seen that the phase of the anode voltage supplied to each of the valves 9V through 14V with respect to the phase of the anode voltage supplied to the valves 21V through 26V will be controlled by the adjusted position of the phase shifting network 52.

The grid to cathode bias voltage of the valve 9V, as above stated, is derived from the transformer T6, the secondary winding 82 of which is connected by means of conductors 84 and 86 through an asymmetrical current flow device 88 to parallelly arranged resistor and capacitor R31, C31. The asymmetric device 88 is polarized to permit the half cycle of voltage induced in the winding 82 during the conducting half cycle of the valve 7V to charge the capacitor C31 and to block the distorted cycle portion induced during the nonconductive half cycle of the valve 7V. The common terminal of the resistor R31 and capacitor C31 connected to the conductor 84 is connected through a grid current controlling resistor 90 to the grid of valve 9V. The other common terminal which is connected with conductor 86 is connected through a conductor 92 to a center tap 94 of a potentiometer 96 energized with direct current by means of full wave rectifying network 98. The right-hand terminal 100 of the potentiometer is connected to the conductor 74 and therethrough to the cathode of the valve 9V. Therefore, during periods in which the transformer T6 is energized, a potential will be placed across the parallelly connected resistor R31 and capacitor C31 which overcomes the blocking potential set up by the potentiometer 96 and the net bias potential is applied between the grid and cathode of the valve 9V to render the valve 9V conductive. The time required for the capacitor to discharge through the resistor R31 to lower its potential sufficiently to permit the potential of the potentiometer 96 to block the valve 9V is preferably over one half cycle but less than a complete cycle so that the valve 9V can only fire during the same cycle that the valve 7V fires. As stated above, the valve 7V will become conductive solely during the initial part of the phase of the voltage applied between its anode and cathode and which is preferably limited to the first 30° of the voltage wave applied thereto which angle is not greater than the minimum expected angle of phase shift of the network 52. Consequently, the proper grid to cathode bias potential for rendering valve 9V conductive will be applied at least as early as the conducting anode to cathode voltage so that the network 22 in effect selects the cycles in which the valves 21V, 23V and 25V are rendered conductive and the phase shifting network 52 selects the instants on the voltage wave between the lines L1, L2 and L3 during which the valves 21V, 23V and 25V conduct.

Upon conduction of the valve 9V, the transformer T13 is energized, energizing its secondary windings 102 and 104. One terminal of the winding 102 is directly connected to the cathode of the valve 15V and the other terminal of this winding is connected to one terminal of parallelly connected resistor R32 and capacitor C32. The other terminal of R32 and C32 is connected through a grid current controlling resistor R33 to the grid of the valve 15V. Normally a direct current blocking grid to cathode bias voltage is maintained on the valve 15V by means of the transformer T20 having a secondary winding 106 connected across the resistor capacitor network R32, C32 in series with an asymmetric current controlling device 108. The relative values of the resistor R32 and capacitor C32 is chosen to provide a rectified substantially constant unidirectional voltage. Upon energization of the transformer T13 the potential supplied by the winding 102 at the portion of the positive half cycle of the anode to cathode voltage of valve 15V as determined by the network 52 overrides the normal voltage maintained across the resistor R32 and capacitor C32 by the transformer T20 and raises the potential of the grid with respect to the cathode of the valve 15V sufficiently to permit the valve 15V to become conductive. The anodes of the valves 15V and 21V are connected together and connected to the line L1 and the cathode of the valve 15V is connected through a fuse F34 to the control element of the valve 21V. Conduction of valve 15V supplies the necessary firing voltage for the valve 21V which then passes current through the winding 142 of transformer T2 from lines L1 and L2.

In the form of the invention shown, the valves 21V through 26V are of the Ignitron type and are provided with igniters 110, 112, 114, 116, 118 and 120 respectively. As stated above, the igniter 110 is connected to the cathode of the valve 15V. Similarly, the igniters 112, 114, 116, 118 and 120 are connected through current fuses F35 F36, F37, F38 and F39 respectively to the cathodes of their respective valves 16V, 17V, 18V, 19V and 20V. The anodes of the valves 16V–22V, 17V–23V, 18V–24V, 19V–25V and 20V–26V are connected together. The line L2 is connected to the anode of the valve 23V and the line L3 is connected to the anode of the valve 25V. The valves 22V, 24V and 26V are arranged in back-toback relationship with the valves 21V, 23V and 25V respectively to conduct during opposite half cycles of the line voltage.

At the same time that the transformer winding 102 was energized to overcome the blocking bias on the valve 15V, the secondary winding 104 of the transformer T13 was energized to unblock the valve 11V. More specifically, the terminals of the winding 104 are connected by means of conductors 122 and 124 across a resistor R40 through an asymmetric current flow device 126 to establish a potential across the capacitor C40 similar to that established the capacitor C31 by transformer T6. One terminal of the resistor R40 (connected in parallel with capacitor C40) is connected 128 to the grid of the valve 11V through the usual grid current controlling resistor. The other terminal of the resistor R40 is connected by means of a cross conductor 130 to the conductor 86 and therethrough and through the conductor 92 and potentiometer 96 and conductor 74 to the cathode of the valve 11V. The potentiometer 96 normally maintains a blocking bias voltage between the grid to cathode of the valve 11V. However upon energization of the winding 104 the potential across the resistor R40 and capacitor C40 overcomes that supplied by the right-hand portion of the potentiometer 96 and places a conducting bias potential on the valve 11V. Upon the supplying of a proper anode potential to the valve 11V from the phase shifting network 52, the valve 11V will conduct to energize the transformer T14.

Transformer T14 like T13 is provided with a pair of secondary windings 132, 134. Upon energization of the winding 132 which is connected between the grid and cathode of the valve 17V similar to the way in which winding 102 is connected to the valve 15V, the normal blocking potential maintained by transformer T21 on the resistor R41 and capacitor C41 is overcome and valve 17V is rendered in a conductive condition to supply the igniting voltage to the valve 23V which energizes the winding 144 of the transformer T2. The winding 134 of transformer T14 applies an unblocking potential across the resistor R42 and capacitor C42 (similar to R31 and C31) for rendering the valve 13V conductive. It will be observed that one terminal of the resistor R42 is directly connected by means of conductor 136 through a current limiting resistor to the control grid of the valve 13V while the other terminal of the resistor is connected through cross connection 138 to the conductor 86 and back to the cathode of the valve 13V through the potentiometer 96 as described in connection with the resistor R40 and valve 11V. At the proper point in the voltage wave being applied between the grid and cathode of the valve 25V by the lines L3 and L1, the phase shifting network 52 will supply an anode potential to the valve 13V which will then conduct and energize the winding 72 of the transformer T15. The transformer T15 has a single secondary winding 140 which overcomes the hold-off bias potential placed on the valve 19V by the transformer T22 acting on the resistor R43 and capacitor C43 to render the valve 19V conductive for initiating conduction of the valve 25V to cause current to pass through the winding 146 of transformer T2.

If the valve 7V remains conducting, the proper grid to cathode bias will again be established on the valve 9V for a subsequent conduction at a time determined by the phase shifting network 52 for initiating a subsequent operation of the valves 21V, 23V and 25V in the manner above described. If however, the valve 7V is rendered nonconductive by the network 4 prior to the placing of the proper anode voltage on the valve 9V by the network 52, the termination of the conduction of the valve 13V will terminate the conductive periods of the valves 21V, 23V and 25V. In this regard it should be observed that during the time that these valves 21V, 23V and 25V are sequentially rendered conductive, a series of unidirectional current pulses will be applied thereby through the primary windings 142, 144 and 146 respectively of the transformer T2 tending to build up a flux in the core of the transformer T2 in the some direction thereby inducing an increasing potential in one direction in the secondary winding 5 for causing current to flow through the work W between the electrodes E.

The conduction of the valve 8V is controlled by network 4 and is permitted to conduct only after extinguishment of the valve 7V. Conduction of valve 8V energizes the transformer T7 to render the valve 10V conductive similarly to the way in which valve 7V rendered valve 9V conductive. The secondary winding 148 of the transformer T7 is connected by means of conductors 150, 152 and an asymmetrical current flow device 154 across a parallelly connected resistor R44 and a capacitor C44 to establish a pulsating unblocking bias potential which overcomes the direct current blocking bias potential provided by the transformer T23. The capacitor C44 and resistor R44 act similarly to the capacitor C31 and resistor R31. One terminal of the capacitor C44 is connected by means of conductor 156 to the controlling grid of the valve 10V through the usual grid current limiting resistor. The other terminal of the capacitor C44 is connected by means of a conductor 158 to one terminal of a parallelly connected resistor R45 and capacitor C45. The other terminal of capacitor C45 and resistor R45 is connected by a conductor 160 to the cathode of the valve 10V. The capacitor C45 and resistor R45 are connected through an asymmetric current flow controlling device 166 across the secondary winding 164 of a transformer T23, the primary winding 162 of which is connected between the lines L4 and L5. When so energized, the resistor and capacitor R45, C45 combination acts to provide a substantially constant unidirectional blocking bias voltage for the valve 10V.

When a conducting grid to cathode bias potential is placed across the valve 10V by the transformer T7 of the network 22, the valve 10V will conduct at the proper time with respect to the phase of the voltage being applied across the valves 22V, 24V and 26V as determined by the phase shifting network 52. Conduction of the valve 10V energizes the primary winding 76 of the transformer T16 having a pair of secondary windings 168 and 170. The winding 168 is connected between the grid and cathode of the valve 16V and when energized furnishes a potential which overrides the substantially constant blocking potential normally applied by the resistor R46 and capacitor C46, maintained thereon by the secondary winding 172 of the transformer T20, in the manner described above in connection with valve 9V to render valve 16V conductive for igniting valve 22V which thereupon passes current from lines L1 and L2 through the winding 142 in a direction opposite to that caused by the conduction of valve 21V. The winding 170 acts to energize resistor R47 and capacitor C47 (similar to R40 and C40) to overcome the blocking bias voltage normally maintained between the grid and cathode of the valve 12V by the resistor capacitor combination R48, C48 supplied with energy from secondary winding 172 of the transformer T23.

At the proper time as determined by the phase shifting network 52, the valve 12V will conduct to energize the transformer T17. Energization of the secondary winding 174 renders the valve 18V conductive to ignite valve 24V which then passes current through the winding 144 of the transformer T2 from the lines L2 and L3. Energization of the secondary winding 176 of the transformer T17 energizes the resistor capacitor combination R49, C49 (similar to C42 and R42) to overcome the blocking bias voltage normally placed on the valve 14V by means of the resistor capacitor combination R50, C50 from the transformer T24. The transformer T24 has its primary winding 174 connected between the line L4 and line L5. Upon conduction of the valve 14V, the transformer T19 is energized to overcome the blocking potential normally maintained on the valve 20V by the resistor R52 and capacitor C52 which is energized by the transformer T22. Conduction of valve 20V ignites valve 26V which passes current through the winding 146. The transformer T19 like the transformer T15 has only a single secondary winding and unless the grid to cathode bias potential maintained on the valve 10V from the transformer T7 of the network 22 maintains the valve 10V in a condition for conduction, the termination of the conduction of the valve 14V will terminate the conductive periods of the 16V, 18V and 20V valve combination.

Conduction of the valves 22V, 24V and 26V causes current to flow through the primary windings 142, 144 and 146 of the transformer T2 in the opposite direction to that caused by conduction of the valves 21V, 23V and 25V whereby flux is built up in the core of the transformer T2 in the opposite direction inducing a voltage in the secondary winding 5 thereof in the opposite direction for causing current to flow through the work W between the electrodes E in the opposite direction.

It is believed that the remainder of the details of construction may best be understood by a description of operation of the apparatus which is as follows:

Upon closure of the line switch LS, the three phase lines L1, L2 and L3 are energized for energizing the transformer T1 whereby the lines L4 and L5 are energized. Energization of the lines L4 and L5 energizes the transformer T3 of the full wave rectifying network to apply a direct current potential between busses 6 and 8. Transformers T4, T5, T8, T9, T10, T11, T12, T23, T24, T20, T21 and T22 are also energized. The enegization of the peaking transformer T4 is without any immediate effect except as it controls the initial point on the voltage wave of the supply line in which the valve 2V becomes conductive. The valve 1V in this instance cannot be rendered conductive due to the open switch contacts 6CRa (FIG. 2) and the network 4 will not pulsate.

Energization of the transformer T5 provides anode voltage for the network 22 and permits the valves 5V and 6V to conduct and energize their respective networks 33 and 35 to bias off and hold the valves 7V and 8V blocked. Energization of the transformer T8 provides the alternating current wave E7 of FIG. 3 which is without effect since the valves 7V and 8V are held nonconductive as stated above. The curve E7 represents the potential appearing across the capacitor C19 when the portion above the neutral line is considered as being positive. The potential which appears across the capacitor C21 is 180° out of phase with that across the capacitor C19 and the curve E7 will represent the voltage which appears across the capacitor C21 when the portion below the neutral line is considered as being positive. Energization of the transformer T9 energizes the potentiometer resistor R18 and charges the capacitor C18 in the polarity indicated to apply a small residual positive voltage between the grid and cathode of valves 5V and 6V to insure their conducting during periods in which there is no blocking voltage appearing across R2 and R17. Energization of the transformer T10, T11 and T12 of the network 52 is without immediate effect since the valves 9V, 11V and 13V are being held in a nonconductive condition by the potentiometer 96 and the valves 10V, 12V and 14V are held nonconductive by the transformers T23 and T24. Since the valves 9V through 14V are held nonconductive, the transformers T13 through T19 will also be deenergized permitting the transformers T20, T21 and T22 to maintain hold-off or blocking bias voltages on the valves 15V through 20V thereby maintaining them and the valves 21V to 26V nonconductive.

Closure of the line switch LS also energizes transformer 200 of the sequencing network shown in FIG. 2. Energization of the transformer 200 energizes the lines 202, 204 thereby energizing the transformer 206, the potential supplied by the secondary winding 208 whereof being rectified in the rectifying network 210 for providing a unidirectional voltage between the busses 212, 214. Energization of the lines 202, 204 also energizes the transformer 216 for applying a phase shifted voltage between the grid $g2$ and cathode of the valve 218 which lags the voltage applied between lines L1 and L2 by approximately 60° to control the periods at which the valve 218 may be rendered conductive. Such a voltage wave will be 180° out of phase with the voltage appearing between L1 and L3 and will maintain a blocking bias potential on valve 218 during the portions of the wave C which are above the neutral line so that the periods during which valve 218 may be rendered conductive will correspond to the lower half cycles of wave C. This action is without effect during standby operation of the sequencing network because at this time the contacts 5CRa of the relay 5CR in the anode circuit of the valve are open.

Energization of the conductors 202, 204 also establishes conduction through valves 230, 262 and 276. Conduction of the valve 230 energizes the squeeze time network 240 controlled thereby to establish a potential across a capacitor 242 thereof. The network 240 is provided with a pair of terminals 246 and 250. The terminal 246 is connected by conductor 247 to the grid of the valve 232 through the usual grid current controlling resistor while the terminal 250 is connected by conductor 252, resistor 254 and conductor 236 to the cathode of valve 232. The valve 232 is thereby held nonconductive and the relay 6CR is de-energized maintaining its contacts 6CRa open. The valve 238 has its grid connected by conductor 248 and the grid current limiting resistor to terminal 246 and its cathode connected by conductors 256, 204 and 252 and resistor 254 to terminal 250 and is likewise held blocked.

The conducting valve 262 energizes the Weld Interval timing network 264 establishing a potential across the capacitor 264 connected between the network terminals 272 and 274. The terminal 272 is connected through a grid current limiting resistor to the gride $g1$ of valve 218 while the terminal 274 is connected to the grid of valve 218 through conductors 252, 204 and 308 and resistor 254 thereby holding valve 218 blocked. The conducting valve 276 energizes the hold timing network 286 establishing a potential across capacitor 288 connected between the network terminals 296 and 292. The terminal 292 is connected through the usual grid current controlling resistor to the grid of valve 294 while the terminal 296 is connected through conductors 298, 202 and 220 and resistor 258 to the cathode of valve 294 so that upon closure of switch SW1 a blocking bias will be applied to valve 294. Until the conductor 220 is energized, the valve 294 will not conduct due to its open anode circuit.

When it is desired to effect a welding operation, the control switch SW1 is closed thereby connecting the line 202 to the line 220. Upon energization of the line 220, current will flow therefrom through a conductor 222, control winding of the relay 5CR, anode to cathode of the valve 224 and through line 226 to the line 204 thereby energizing the relay 5CR which immediately closes its contacts, 5CRa, 5CRb and 5CRc. Closure of the contacts 5CRb energizes a relay 1CR which closes its contacts 1CRa establishing a local circuit for causing the electrodes E to be pressed against the work W in a manner well known in the art. Closure of the contacts 5CRc closes a circuit in parallel with the switch SW1 so that the line 220 will remain connected to the line 202 even though the switch SW1 be opened. Closure of the contacts 5CRa completes the anode circuit for the valve 218.

Conduction of the valve 224 also energizes the transformer 228 which supplies a blocking bias potential between the grid and cathode of the valve 230 which thereupon stops conducting and permits the squeeze time capacitor 242 to discharge through the resistor 244. After a predetermined time interval, sufficient to complete the clamping operation of the electrodes E, this potential will fall sufficiently to permit the valve 232 to conduct and close a circuit from the line 220 through line 234, energizing winding of the relay 6CR, valve 232 and conductor 236 to the line 204 thereby energizing relay 6CR.

Energization of the relay 6CR closes its contacts 6CRa which closes a circuit through conductor 12, the normally closed contacts 7CRa of the relay 7CR to connect the anode of the valve 1V with the conductor 16. When the valve 1V is biased to a conductive condition it will conduct to initiate a welding operation, the details of which will be set forth in greater detail hereinafter.

Rendering of the valve 230 nonconductive with the consequent discharge of the network 240 also reduces the bias potential applied between the grid and cathode of the valve 238 permitting it to conduct. Conduction of the valve 238 establishes a potential across the resistor 260 and capacitor 261 thereby blocking the normally conducting valve 262 which has its grid connected through a grid current limiting resistor to one terminal of capacitor 261 and its cathode connected by conductors 263 and 202 and resistor 258 to the other terminal of capacitor 261.

Blocking of the valve 262 permits the capacitor 266 of the network 264 to discharge through the series connected resistors 268 and 270. After a predetermined time period which is the weld interval period the charge on capacitor 266 will have discharged sufficiently to remove the blocking bias set up between the control grid $g1$ and cathode of the valve 218.

Removal of the blocking bias set up between the control grid $g1$ and cathode of the valve 218 places this valve under control of its grid $g2$. The bias between the grid $g2$ and cathode is composed of two different potential portions, one derived from the resistor R2 and the other derived from the capacitor 307. More specifically, the grid $g2$ of the valve 218 is connected by means of conductor 300 to the common point of resistors R1 and R2. The cathode of valve 218 is connected by conductor 308 and capacitor 307 to conductor 302 which is connected to the common point of resistor R2 and bus 6. The primary winding of transformer 216 is connected between conductors 202 and 204. One end of the secondary winding 304 is connected by conductor 301 to conductor 308 and the other end is connected through resistor 306 and capacitor 307 to conductor 308 whereby a phase shifted voltage is maintained across capacitor 307.

The potential across R2 is a function of the conductive condition of valve 1V and is unidirectional in character while the potential across capacitor 307 is alternating being derived from the winding 304 and phased and polarized, as indicated above, to permit the initiation of conduction of the valve 218 only at the desired time intervals $t1$–$t2$ or $t3$–$t4$. The value of the potential appearing across resistor R2 during conductive periods of the valve 1V is sufficient to completely overcome the potential appearing across capacitor 307 so that the valve 218 will be held blocked during all times in which the valve 1V is conducting. During nonconductive periods of the valve 1V the potential across capacitor 307 dominates any potential across the resistor R2 and will act to bias the valve 218 into a conductive condition during the times $t1$–$t2$ and $t3$–$t4$.

Referring to FIG. 3 it will be seen that valve 218 can only become conductive between times $t1$ and $t2$ or $t3$ and $t4$. If it becomes conductive during the period $t1$–$t2$, the relay 7CR need open its contacts only before the time $t5$ to prevent a refiring of valve 1V. If it opens at time $t4$ there is still ample time, nearly a complete half cycle in which the relay can open its contacts 7CRa. As stated above, there can be no initiation of conduction by valve 218 between times $t6$ and $t7$ because of the magnitude of the blocking bias by resistor R2 and no initiation of conduction between the times $t4$ and $t5$ because of the negative hold off bias afforded by the transformer 216.

The anode to cathode circuit for the valve 218 is connected between the direct current conductors 212 and 214 from the rectifying network 210. Upon conduction of the valve, current will flow from the conductor 212 through the now closed contacts 5CRa through the valve 218 through the conductors 308 and 204, resistor 254, conductors 252 and 282, winding of the relay 7CR and back through conductor 278 to the conductor 214. Energization of the relay 7CR opens its normally closed contacts 7CRa in the conductor 12 thereby initiating the termination of the flow of welding current as will be described below.

The control grid $g1$ of valve 276 is connected through the usual grid current controlling resistor and conductor 278 to one terminal of the energizing winding of relay 7CR. The cathode of this valve 276 is connected by means of conductors 284 and 204, resistor 254 and the conductors 252 and 282 to the opposite terminal of the winding of relay 7CR whereby energization of the relay 7CR and the consequent potential thereacross acts to apply a blocking bias voltage to the valve 276 thereby terminating current flow therethrough to initiate the timing out of the hold time network 286. After the capacitor 288 has discharged sufficiently through the resistor 290, the blocking bias established by this network 286 between the grid and cathode of the valve 294 will disappear and the valve 294 will conduct energizing the off time network 310 whereby a potential will be established across the capacitor 312 thereof.

One terminal 314 of the network 310 is connected by means of conductor 316 through the usual grid current limiting resistor to the control grid of the valve 224. The other terminal 318 of the network 310 is connected to the conductor 252 and through the resistor 254 and the conductors 204 and 226 to the cathode of the valve 224. Therefore upon the conduction of the valve 294 and the establishment of a potential across the network 310, a blocking bias will be placed between the grid and cathode of the valve 224 which blocks this valve to de-energize the transformer 228 and the relay 5CR permitting its contacts 5CRa, 5CRb and 5CRc to open.

Opening of the contacts 5CRa breaks the direct current anode circuit of the valve 218 de-energizing the relay 7CR permitting its contacts 7CRa to close. Opening of the contacts 5CRb de-energizes the relay 1CR permitting the electrodes E to withdraw from the work W through the usual circuit well understood in the art. Opening of the contacts 5CRc de-energizes the line 220 if the switch SW1 is open and is without effect if the switch SW1 is maintained closed.

Assuming that the pilot switch SW1 is closed, the de-energization of the transformer 228 will remove the blocking bias on the valve 230 and it will conduct thereby energizing the network 240 which will quickly block the valves 232 and 238. Blocking of the valve 232 de-energizes the relay 6CR permitting its contacts 6CRa to open thereby preventing the restarting of the pulsations of the valves 1V and 2V. Blocking of the valve 238 removes the potential from across the resistors 258 and 260 thereby removing the blocking potential from the valve 262 which again conducts. Conduction of valve 262 energizes the network 264 placing a blocking potential between the grid $g1$ and cathode of the valve 218 which is without immediate effect since conduction therethrough and consequent energization of the relay 7CR occurred due to the opening of the contacts 5CRa. The network 264 will however prevent reconducting of the valve 218 upon reclosure of the contacts 5CRa. De-energization of relay 7CR permits closure of its normally closed contacts 7CRa which is without effect, as to the network 4 (FIG. 1A), due to the now open condition of the contacts 6CRa but does remove the blocking bias between the grid $g1$ and cathode of the valve 276. If the Single-Repeat switch 321 is in the R or repeat position, as shown, the grid $g2$ of valve 276 will be at cathode potential and removal of the blocking potential from grid $g1$ will permit it to conduct. Conduction of valve 276 energizes the network 286 which places a blocking bias between the grid and cathode of the valve 294 to block the same. Blocking of the valve 294 permits the capacitor 312 of the off-time network 310 to discharge through its discharge resistor 320. The capacitor 312 will discharge at a desired rate to a predetermined extent during a desired time interval as determined by resistor 320 to establish the off-time of the apparatus. At the end of the off-time, the blocking bias will be removed between the grid and cathode of the valve 226 whereby the sequencing network of FIG. 2 will go through a subsequent cycle as above described.

If, however, the switch 321 is in the S position, the network 320 will place a blocking bias between the grid $g2$ and cathode of the valve 276 which will maintain valve 276 blocked preventing the re-energization of the network 286 without which the valve 294 will continue to conduct. A reoperation of the sequencing network is accomplished by opening the switch SW1 for a sufficient time to permit the network 320 to de-energize and subsequently closing the switch SW1 which will then initiate a subsequent sequencing operation as above described.

If during the course of the welding operation the switch SW1 was opened, opening of the contacts 5CR$c$ de-energizes the conductor 220 whereby the anode circuits to valves 224, 232 and 294 are de-energized causing a consequent de-energization of relay 6CR and the discharge of the network 310. The blocking biases for the valves 230, 262 and 276 will be removed and the circuit will revert back to the condition originally described which occurred upon closure of the line switch LS.

Referring now more particularly to FIGS. 1A, 1B and 1C, and considering the operation thereof before energization of the relay 6CR and closure of its contacts 6CR$a$. The capacitor C1 will have discharged through its discharge circuit extending from one terminal of this capacitor C1 through the resistor R6, the adjustable tap 18, variable resistor R7, to the other terminal of the capacitor C1. The valve 2V will be conducting connecting the positive bus 6 through the resistors R3 and R4 to the conductor 14 and through the resistor R5 back to the negative bus 8. The potential of the anode of valve 2V approaches the potential of the negative bus differing therefrom by the voltage drop of 2V. The capacitor C3 will have been charged such that its left-hand terminal is positive with respect to its right-hand terminal since during the periods of nonconduction of the valve 1V, the potential of the conductor 16 will be substantially that of the positive bus 6. The capacitor C2 will be charged due to the grid conduction of the valve 2V.

Upon energization of the relay 6CR the contacts 6CR$a$ thereof close completing the anode circuit of the valve 1V. This closure can occur during any portion of the cycle of the voltage wave A appearing between the lines L1 and L2 or somewhere between the times $t8$ and $t6$, the time interval between successive positive voltage pulses P1 of the peaking transformer T4 applied between the grid $g2$ and cathode of valve 1V. At time $t6$ the peaking transformer T4 will apply a voltage pulse between grid $g2$ and cathode of valve 1V whereby it will commence to conduct and establish a potential across the resistors R1 and R2. The potential across R1 will place a blocking bias between the grid and cathode of valve 5V while potential across R2 will place a blocking bias between the grid $g2$ and cathode of valve 218.

Conduction of valve 1V also lowers the potential of the conductor 16 to substantially that of conductor 14. This lowers the potential of the left-hand side of the capacitor C3 to substantially that of the conductor 14. Since the right-hand terminal of the commutating capacitor C3 is at a lower potential than that of the left-hand side, the potential of the anode of the valve 2V will be instantaneously made more negative than that of the cathode of the valve 2V and the valve 2V will become extinguished. Since, as above noted, the capacitor C2 was charged by the grid conduction of the grid $g1$ of the valve 2V, lowering of the potential of the conductor 16 to substantially that of the conductor 14, lowers the potential of the grid $g1$ with respect to the cathode of the valve 2V thereby holding the valve 2V in its nonconductive condition. The capacitor C2 commences to discharge through its discharge circuit which extends from its upper or the positive terminal through the resistor R8, the adjustable tap 20 thereof and resistor R9 back to the lower or negative terminal of the capacitor C2 which rate of discharge is controlled by the adjusted constants of the circuit elements and primarily by the value of R9.

Upon blocking of the valve 2V, the potential drop across the resistors R3 and R4 substantially disappears thereby raising the anode potential of the valve 2V to substantially that of the positive bus 6. Charging current then flows from the bus 6 through the resistors R3 and R4, through the capacitor C1, and grid to cathode in the valve 1V to charge this capacitor with its upper terminal positive with respect to its lower terminal. During the period in which valve 1V is conducting the commutating capacitor C3 changes polarity so that its positive terminal will be that connected to the anode of the valve 2V and its negative terminal will be that connected to the anode of the valve 1V.

The discharge time of the capacitor C2 is related to the desired output frequency of the transformer T2 and to the frequency of the voltage waves A, B and C appearing between the lines L1 and L2, L2 and L3, and L3 and L1, respectively to provide a conducting bias voltage between grid $g1$ and cathode of valve 2V substantially at or slightly before the time $t7$ so that the valve 2V will conduct upon the application of a conducting bias between grid $g2$ and cathode of valve 2V by the transformer T4 at the time $t7$.

Immediately upon conduction of the valve 2V the potential of the right-hand terminal of the commutating capacitor C3 will be lowered to substantially the potential of the conductor 14 thereby instantaneously forcing the potential of the anode of the valve 1V to a potential which is less than the arc drop of the valve 1V to extinguish this valve. Similarly the potential applied between the grid $g1$ and the cathode of the valve 1V by the capacitor C1 will be negative and maintain this valve 1V blocked until the capacitor C1 has had time to discharge through its discharge circuit, the time being primarily determined by the resistor R7. During this period the capacitor C2 will charge due to grid-cathode conduction of valve 2V and the commutating capacitor C3 will again assume the polarity indicated in FIG. 1A. The discharge time of the capacitor C1 is selected similarly to that of the capacitor C2 so that a conducting bias potential will be placed between the grid $g1$ and cathode of valve 1V substantially at or just before the time $t5$ so that upon the occurrence of the peaking potential of the transformer T4 between the grid $g2$ and cathode of valve 1V it will again conduct.

The valves 1V and 2V will continue to pulsate in timed frequency and in step with the voltage wave A as long as the relay 7CR is maintained de-energized and the relay 6CR is maintained energized.

Conduction of the valve 1V establishes a potential E1 across the resistor R2 which is applied between the grid and cathode of the valve 5V and, since the potential E1 is more negative than the critical voltage E1$a$ at which the valve will block, the valve blocks. It should be noted that blocking of valves 5V and 6V because of their phasing with respect to network 4 will occur during their nonconductive half cycles and will affect immediate control. Blocking of the valve 5V permits the network 33 to discharge through the resistors R10, R11 and R12. Preferably, this time is adjustable by means of the adjustable resistor R12 and controls the "interpulse" time or the time delay between the time the transformer is energized by the valves 21V, 23V and 25V after energization of the valves 22V, 24V and 26V. This time interval becomes of importance when the power factor at which the transformer T2 operates is other than unity. In the case of a lagging power factor, this time interval provides the necessary delay to permit the current flowing to reach substantially zero before the transformer T2 is energized in the opposite direction. Upon removal of the blocking voltage E10 (FIG. 3) set up by the network 33, the winding 38 of the transformer T8 will render valve V7 conductive at the desired point t9 on the voltage wave E6. The curve E6 represents the voltage which is impressed between the anode and cathode of the valve 7V. As explained above, the phase relationship of the voltage E7 supplied by the winding 38 due to the effect of the capacitor C19 and resistor R19 will be in the vicinity of 150 electrical degrees ahead of the voltage E6 applied between the anode and cathode of the valve 7V so that the valve 7V must start conducting if at all during the first 30° of the voltage wave supplied by the winding 26.

Conduction of the valve 7V energizes the transformer T6 which then applies a potential across the resistor capacitor R31, C31 to overcome the blocking bias voltage applied by the potentiometer 96 to render the valve 9V in a conductive condition. At the proper time in the wave of voltage E9 being applied between its anode and cathode as determined by the phase shifting network 52 (time t10), the valve 9V will conduct energizing the transformer T13 which renders the valve 15V conductive for igniting the ignition valve 21V to initiate the build up of flux F1 in the transformer T2. Transformer T13 also supplies a pulse of voltage across the resistor capacitor combination R40, C40 for rendering the valve 11V in a conductive condition. As the voltage E11 of the second phase of the lines L1, L2, L3 from the phase shifting network 52 becomes of correct polarity across the valve 11V it will conduct, energizing the transformer T14 which unblocks the firing valve 17V and fires the Ignitron valve 23V to further build up flux F1 in the transformer T2. The transformer T14 also establishes a potential across the resistor capacitor combination R49, C49 unblocking the valve 13V which when the voltage E13 of the third phase of the lines L1, L2 and L3 from the network 52 becomes correct will conduct to fire the valve 19V and Ignitron valve 25V to still further build up flux F1 in the transformer T2.

More specifically, conduction of the valve 21V causes a flow of current from the line L1 through the winding 142 to the line L2 thereby initiating a build up in flux F1 in one direction in the core of the transformer T2. Firing of the valve 23V causes current to flow from the line L2 through the winding 144 to the line L3 and firing of the valve 25V causes current to flow from the line L3 through the winding 146 back to the line L1 all in the same direction for building up the flux F1. This change in flux will induce a voltage in the secondary winding 5 thereof causing welding current to flow through the work W between the electrodes E.

If the valve 1V remains conductive to unblock the valve 9V at the time that the phase shifted voltage E9 supplied thereto from the phase shifting network 52 is of correct polarity and magnitude for conduction of the valve 9V, it will again conduct causing a sequential firing of the valves 11V and 13V and these valves 9V, 11V and 13V will continue to be sequentially fired and continue to build up the flux F1 as long as the valve 1V remains conducting at the instants that network 52 supplies the voltage E9 in a polarity and magnitude to cause the valve 9V to conduct.

During the conductive condition of valve 1V, there will be no potential drop across the resistor R17 and the valve 6V will be conducting to establish a potential drop across the network 35 which is applied between the grid and cathode of the valve 8V to maintain this valve blocked. The transformer T7 will be de-energized and no firing of the valves 10V, 12V and 14V will occur. An asymmetric current flow device RE1 is connected in parallel with the resistor R17 so that the capacitor C17 will rapidly discharge to a substantially completely discharged condition during the conductive conditions of valve 1V so that upon each conduction of valve 2V substantially the same charging current will be required for the capacitor C17 and substantially identical potential curves E2 will occur each such conduction of valve 2V for a purpose which will become clear below.

At time t7 (FIG. 3) the valve 2V commences to conduct and the valve 1V will be extinguished, as described above, terminating the potential drop across the resistor R2 which was holding the valve 5V blocked. Valve 5V will now conduct energizing the network 33 which applies a blocking bias voltage E10 (FIG. 3) between the grid and cathode of the valve 7V terminating further conduction therethrough and de-energizing the transformer T6 and thereby preventing a new sequence of conduction of the valves 9V, 11V and 13V. As soon as the valve 2V conducts (time t7) due to the application of pulse P2 by the transformer T4 between the grid g2 and cathode of the valve 2V, a potential drop will be established across the resistor R4 which will establish a potential across the series connected resistor R17 and capacitor C17. Charging current for the capacitor C17 will then flow through the resistor R17 establishing a potential drop E2 thereacross which is applied between the grid and cathode of the valve 6V to block this valve. Blocking of the valve 6V de-energizes the network 35 and the blocking bias voltage E12 between the grid and cathode of the valve 8V will decrease and at the desired point t11 on the wave E6 the wave E7 will permit conduction of the valve 8V. When the waves or curves E6, E7 and E12 are referred to the valves 6V and 7V, the portion above the neutral line is to be considered as negative and that below as positive.

The valves 8V, 10V, 12V, 14V, 16V, 18V, 20V, 22V, 24V and 26V are all arranged to conduct current of opposite polarity to the valves 7V, 9V, 11V, 13V, 15V, 17V, 19V, 21V, 23V and 25V and are capable of conducting during the lower loop thereof while the odd numbered valves 7V–25V are capable of conduction during the upper loop. This is diagrammatically shown in FIG. 3 in which 7V and 8V are shown in opposite polarity. This figure also shows the polarity of valves 6V and 5V as being the same as 7V and 8V respectively.

Conduction of the valve 8V energizes the transformer T7 whereby its secondary winding 148 established a potential across the resistor capacitor R44, C44, similarly to the establishment of the potential across the resistor capacitor R31, C31 by the transformer T6, to provide an unblocking potential for overcoming the direct current blocking potential provided by the transformer T23 whereby the valve 10V is rendered in a conductive condition. When the proper polarity of the voltage E9 is applied between the anode and cathode of the valve 10V by the phase shifting network 52, which occurs at the time t12, the valve 10V will conduct, energizing the transformer T16.

Upon energization, the secondary winding 168 of the transformer T16 will overcome the direct current blocking bias provided by the transformer T20 and permit the valve 16V to conduct thereby supplying the igniting potential to the igniter 112 of the valve 22V. Valve 22V then commences to conduct (at t12) and causes a pulse of current from the lines L1 and L2 (lower loop of the voltage wave A) to flow through the winding 142 of transformer T2 in a direction opposite to the flow of current through this winding 142 due to conduction of the valve 21V. This flow of current established by the valve 22V initiates the build up of flux F2 in the transformer T2 starting the negative half cycle of the voltage in the output winding 5.

Energization of the secondary winding 170 of the transformer T16 causes it to apply an unblocking bias potential across the resistor capacitor R47, C 47, in the same manner, as did the winding 104 across the resistor capacitor R40, C40 to overcome the direct current blocking bias placed on the valve 11V by the secondary winding 172 of the transformer T23.

At the proper point on the voltage wave E11 supplied by the network 52, the valve 12V will conduct energizing the transformer T17 which renders the valve 18V conductive to cause the valve 24V to supply voltage from the lines L2 and L3 (curve B) to the winding 144 causing a still further build up of the flux F2. Energization of the transformer T17 also establishes an unblocking bias potential across the resistor capacitor R49, C49 which overcomes the direct current blocking bias provided by the transformer T24 and renders the valve 14V in a conductive condition.

At the proper time on the voltage wave E13, the valve 14V will conduct energizing the transformer T19 which provides an unblocking bias voltage for overcoming the direct current blocking bias voltage provided by the transformer T22 rendering the valve 20V conductive. The valve 20V renders the valve 26V conductive to supply voltage from the lines L3 and L1 (curve C) to the winding 146 for still further increasing the build up of flux F2. If at this time, as shown, the valve 2V is still conducting, the transformer T7 will be energized causing a reinitiation of the above described sequence of operation of the even numbered valves 10V through 26V.

Assuming that the network 264 of FIG. 2 has not timed out and the valve 218 is held blocked thereby, the relay 7CR will not be energized for terminating the weld interval at the time $t5$ and the valve 1V will again be rendered conductive establishing the potential E1 for blocking the valve 5V and initiating a subsequent conductive cycle of the odd numbered valves 7V through 25V as above described.

At the time $t5$ the valve 1V will be rendered conductive by the pulse P1 and will cause the valve 2V to be extinguished. Extinguishment of the valve 2V immediately removes the blocking bias potential E2 which, it is to be noted, is during a portion of the wave E6 in which valve 6V may conduct and valve 8V cannot conduct because of the polarity of the voltage E6. Valve 6V immediately conducts to establish voltage E12 which places a blocking bias on valve 8V before the wave E6 is polarized to cause the valve 8V to conduct (time $t13$). Rendering of valve 1V conductive at time $t5$ places the potential E1 on the valve 5V during the half cycle in which it cannot conduct due to the polarity of the voltage and prevents 5V from reconducting on the next half cycle of voltage E6. The voltage E10 of the network 33 will continue to decrease so that at time $t14$ the valve 7V will conduct. It will be noted that during the half cycle of voltage E6 between time $t5$ and $t13$ the valve 7V was held nonconductive by the voltage E10 which was built up during the previous half cycle in which valve 5V was conducting.

The slope of E10 is controlled by the resistor R12 and controls the "interpulse" time between the flux build up F2 and F1. In the event of an out of phase current flowing in T2 as normally occurs in welding operations, this interval permits a time lag for this current to terminate. It will be apparent that networks 35 and 33 respectively control the time intervals between F1 and F2 and F2 and F1 and that the valves 2V, 6V and 8V cooperate together as do valves 1V, 5V and 7V.

If, however, the network 264 of FIG. 2 has timed out during the interval between $t7$ and $t4$ and, for purposes of explanation during the interval $t2$ to $t4$, the blocking bias between the grid $g1$ and cathode of the valve 218 will be removed and permit the valve 218 to be rendered conductive under control of the bias voltage placed between its grid $g2$ and cathode of the valve 218 by the resistor 306. Somewhere during the interval $t3$–$t4$ the bias voltage of resistor 306 will render the valve 218 conductive. Conduction of valve 218 energizes the relay 7CR causing it to open its contacts 7CR$a$ which de-energizes the anode circuit to the valve 1V and prevents a conductive pulse from being established in the valve 1V at the time $t5$. The contacts of the relay 7CR are normally closed and upon energization of the relay 7CR are rapidly opened well within the slightly less than one-half cycle of the alternating current wave of the lines L1, L2 and L3 which occurs before valve 1V would normally become conductive. Of course, if the weld interval network 264 timed out between $t7$ and $t2$, the valve 218 would be rendered conductive somewhere during the interval $t1$–$t2$ energizing the relay 7CR and its contacts 7CR$a$ would be opened much sooner. However, opening of these contacts sooner will not change the operation of the conductive cycle of the valve 2V, as will be explained below.

If the network 264 timed out during the interval $t6$–$t7$ the bias voltage appearing across the resistor R2 will overcome the bias voltage of resistor 306 and maintain valve 218 nonconductive or blocked. The effect of such a time out would have the same result as a time out between time $t7$ and $t1$ since during the interval $t6$–$t7$ valve 218 is blocked by R2 and between $t7$ and $t1$ it is blocked by resistor 306.

Continuing on the assumption that the weld time interval network 264 timed out prior to the time $t4$, the voltage E2 appearing across the resistor R17, instead of disappearing at the time $t5$, will follow the dotted curve E2$a$. It will be noted that the critical bias voltage E2$b$, which will block the valve 6V, intersects the line E2–E2$a$ at the time $t5$ whereby the valve 6V is no longer blocked. The valve 6V will consequently again conduct energizing the network 35 to re-establish the blocking bias potential E12 and prevent reconduction of the valve 8V which would otherwise normally occur at the time $t13$. With valve 8V blocked, the transformer T7 is de-energized and ineffective to again establish a sequence of conduction of the even numebered valves 10V through 26V, and the second or negative half cycle of the voltage wave in the secondary winding 5 of the transformer T2 caused by the build up of flux F2 will be terminated.

As will be apparent from the foregoing, the adjustment of resistors R7 and R9 will effect the length of time between the time intervals $t6$–$t7$ and $t7$–$t5$ to determine the frequency of the voltage wave in the output of secondary winding 5 of the transformer T2. The adjustment of the resistors R12 and R16 adjust the length of "interpulse" time or time between the termination of the build up of flux in the transformer T2 in one direction and the time of initiating of the build up of flux in the opposite direction to allow the lagging power factor current in the load circuit to decrease to zero prior to the build up of flux in the transformer T2 for the next opposite half cycle. In this regard it is important that the adjustment of the resistor R17 be such that it will control the slope of the curve E2–E2$a$ so that it will cross the line E2$b$ substantially at or slightly before the time $t5$ to insure a reconduction of the valve 6V and an establishment of the blocking bias voltage E12 before valve 8V again conducts to energize the transformer T7 for initiating a series of conductive conditions of the even numbered valves 10V through 26V. The crossing of the curves E2 and E2$b$ should be between times $t15$ and $t5$. By providing the bias voltage for the valve 6V as a function of the potential across the resistor R17 which is a function of the charging current of the capacitor C17 it is possible to permit the valve 2V to remain conductive without blocking the valve 6V.

It will also be appreciated from the foregoing that the adjustment of the phase shifting network 52 will change the relative positions of the voltage waves E9, E11 and E13 with respect to the waves A, B and C appearing between the lines L1, L2 and L3 to control the magnitude of energy supplied to the transformer T2 and consequently that applied by the welding electrodes E to the work W. In such event the times $t10$ and $t12$ will also be shifted and the shape of the curves F1 and F2 will also be affected.

What is claimed and is desired to be secured by United States Letters Patent is as follows:

1. In an electrical controlling apparatus for supplying an electrical load from an alternating electrical source, a pair of normally de-energized voltage producing devices, a pair of current controlling means individually associated with said pair of devices for controlling the energization thereof, one of said means normally being conductive and the other of said means normally being nonconductive, means for actuating said current controlling means to render them alternately conductive and nonconductive at a desired frequency to energize said devices, said actuating means including means responsive to the frequency of said source for synchronizing the instant of initiation of conduction of said current controlling means with respect to the voltage wave of said source, means associated with the one of said devices which is associated with said one current controlling means for rendering said one device energized solely for a predetermined time interval irrespective of the continued conduction of said one current controlling means, a pair of asymmetric current conducting devices connected to conduct current between said source and said load in opposite directions, and means responsive to the energization of one of said voltage producing devices for rendering one of said asymmetric devices conductive and responsive to the energization of the other of said voltage producing devices for rendering the other of said asymmetric devices conductive.

2. The combination of claim 1 in which said current controlling means include a pair of valves having said devices in series therewith, said associated means including one of said devices having a reactive portion in series with said one device whereby upon initiation of a change in conductive condition of the one of said valves in series with said one device a voltage will appear across said one device solely during a predetermined time interval subsequent to said change in condition of said one valve.

3. In a network for supplying single phase alternating voltage to a load circuit from a polyphase source of voltage supply, frequency control means for supplying pulses of voltage at twice the desired frequency of said load circuit, a first set of asymmetric current conducting means individually connecting each of said source phases to said load circuit, a second set of asymmetric current conducting means individually connecting each of said source phases to said load circuit, said first set of asymmetric means being connected to supply voltage in a direction opposite to that of said second set of asymmetric means, means responsive to alternate pulses of said frequency control means for rendering said first set conductive, means responsive to opposite alternate pulses of said frequency control means for rendering said second set conductive, and means effective subsequent to the supplying of a voltage pulse by said frequency control means for preventing the initial rendering of said first and said second set of asymmetric means conductive except during an initial portion of the voltage wave of said source.

4. In a network for supplying single phase alternating voltage to a load circuit from a polyphase alternating voltage supply, a multi-vibrator circuit supplying a voltage pulse for each half cycle of said load frequency, means responsive to said supply frequency for synchronizing said multi-vibrator whereby the pulses thereof are initiated in predetermined phase relationship to the supply voltage, a first set of asymmetric current conducting means individual to each of said source phases for conducting current to said load solely in one direction, a second set of asymmetric current conducting means individual to each of said source phases for conducting current to said load solely in a direction opposite to said one direction, means responsive to alternate ones of said vibrator pulses and including time delay means for rendering said first set of asymmetric means conductive in predetermined sequence at a predetermined time interval subsequent to the initiation of said alternate pulses, and means responsive to the intermediate ones of said vibrator pulses and including time delay means for rendering said second set of asymmetric means conductive in predetermined sequence at a predetermined time interval subsequent to the initiation of said intermediate pulses.

5. In a control circuit for controlling the flow of current to a load circuit from a source of polyphase alternating potential, a pair of terminals adapted to be energized from a source of unidirectional potential, a first and second valve, each said valve having main electrodes and a pair of control electrodes, circuit means including impedance elements connecting said main electrodes between said terminals, a pair of potential supplying devices having terminals, means connecting a first terminal of a first of said devices to one of said control electrodes of said first valve, means connecting a first terminal of a second of said devices to one of said control electrodes of said second valve, means including at least a portion of said circuit means for charging said devices with a potential, said second device being connected to one of said second valve main electrodes as a consequence of conduction of said first valve, said first device being connected to one of said first valve main electrodes as a consequence of conduction of said second valve, potential supplying means having a pulsating output potential in predetermined phase relationship to that of such source and connected between each of the other of said control electrodes of said valves and said one main electrodes to render said valve conductive solely during predetermined portions of the voltage wave of said source, a pair of valves for each of the phases of said source, each of said last-named valves having a pair of main electrodes and a control electrode, means responsive to the conductive condition of one of each of said pairs of valves for controlling the flow of current from the phase of said source with which they are respectively associated to said load in a first direction, means responsive to the conductive condition of another of each of said pairs of valves for controlling the flow of current from the phase of said source with which they are respectively associated to said load in a second direction, circuit means connected between said control electrode and one of said main electrodes of said one valve of one of said pairs of valves and between said control electrode and one of said main electrodes of said other valve of said one pair, said last-named circuit means being controlled as a function of the potential across certain of said impedance elements whereby said one pair of valves is controlled by said first and second valve, sequencing means effective to actuate said one valves in sequence as a consequence of the actuation of said one valve of said one pair of valves, sequencing means effective to actuate said other valves in sequence as a consequence of the actuation of said other valve of said one pair of valves.

6. In a control circuit for controlling the flow of current to a load circuit from a source of polyphase alternating potential, a pair of terminals adapted to be energized from a source of unidirectional potential, a first and second valve, each said valve having main electrodes and a pair of control electrodes, circuit means including impedance elements connecting said main electrodes between said terminals, a pair of potential supplying devices having terminals, means connecting a first terminal of a first of said devices to one of said control electrodes of said first valve, means connecting a first terminal of a second of said devices to one of said control electrodes of said second valve, means including at least a portion of said circuit means for charging said devices with a potential, said second device being connected to one of said second valve main electrodes as a consequence of conduction of said first valve, said first device being connected to one of said first valve main electrodes as a consequence of conduction of said second valve, potential supplying means having a pulsating output potential in predetermined phase relationship to that of such source and connected between each of the other of said control electrodes of said valves and said one main electrodes to render said valve conductive solely during a predetermined portion of the voltage wave of said source, a pair of valves for each of the phases of said source, each of said last-named valves having a pair of main electrodes and a control electrode, means responsive to the conductive condition of one of each of said pairs of valves for controlling the flow of current from the phase of said source with which they are respectively associated to said load in a first direction, means responsive to the conductive condition of another of each of said pairs of valves for controlling the flow of current from the phase of said source with which they are respectively associated to said load in a second direction, and circuit means connected between said control electrode and one of said main electrodes of said one valve of one of said pairs of valves and between said control electrode and one of said main electrodes of said other valve of said one pair, said last-named circuit means being controlled as a function of the potential across certain of said impedance elements whereby said one pair of valves is controlled by said first and second valve, sequencing means effective to actuate said one valve in sequence as a consequence of the actuation of said one valve of said one pair of valves, sequencing means effective to actuate said other valves in sequence as a consequence of the actuation of said other valve of said one pair of valves, a phase shifting network, means for supplying said shifting network with a potential which is in predetermined phase relationship with that of said source, said shifting network having a polyphase output equal in number to that of said source, and means individually connecting said main electrodes of each said pair of valves with one of said phase shifting network output phases.

7. In an electrical network adapted to transfer electrical energy from a main source of alternating potential of one frequency to a load at a second frequency, means providing a source of direct current potential, a plurality of discontinuous control-type valves each said valve having a pair of main electrodes and a control means for controlling the initiation of current flow through said valve between said main electrodes, a first and second of said valves having their main electrodes connected across said direct current source, impedance means connected in series with said main electrodes of said first and second valves, a pair of potential storage means, means connecting a first of said storage means to said control means of said first valve and a second of said storage means to said control means of said second valve, said second storage means being connected to one of said main electrodes of said second valve as a consequence of the conductive condition of said first valve, said first storage means being connected to one of said main electrodes of said first valve as a consequence of the conductive condition of said second valve, means for applying an alternating potential, having a predetermined phase relation with respect to a phase of said source, between said control means and said one main electrode of said first and said second valves, means connecting said main electrodes of a third and a fourth of said valves across an alternating potential having a predetermined phase with respect to said source, means responsive to a conductive condition of said first valve for applying a control potential between said control means and one of said main electrodes of said third valve and responsive to a conductive condition of said second valve for applying a control potential between said control means and one of said main electrodes of said fourth valve, a pair of asymmetric current flow controlling means connected between said source and said load, one of said asymmetric means being connected oppositely to the other of said asymmetric means, and means controlling said one asymmetric means as a consequence of a conductive condition of said third valve and controlling said other asymmetric means as a consequence of a conductive condition of said fourth valve, said last-named means including time delay means to predetermine the time interval between the actuation of said third and fourth valves and said asymmetric means controlled thereby.

8. In a device for controlling the supply of energy transferred from a polyphase alternating current source to a single phase alternating current load, a pair of asymmetrical current conducting devices connected between each of said source phases and said load, the devices of each said pair being in back-to-back relation whereby a first of said devices permits current to flow to said load in one direction and a second of said devices permits current to flow to said load in an opposite direction, a control device for each said asymmetrical device, circuit means interconnecting said control devices associated with corresponding first ones of said asymmetrical devices and effective upon operation of one of said first control devices to render the remainder thereof conductive in sequence, circuit means interconnecting said control devices associated with corresponding second ones of said asymmetrical devices effective upon operation of one of said second control devices to render the remainder thereof conductive in sequence, a multivibrator network having a pair of valves which are alternately energized, means controlling the rate of energization of said valves including a time responsive portion and a portion responsive to the voltage wave of said source whereby said valves are alternately energized at a desired frequency and in step with said source voltage, a timing network comprising a third valve having a pair of main electrodes and a pair of control electrodes, circuit means for applying a first source of bias potential between one of said main electrodes and one of said control electrodes including timing means whereby said circuit means acts to provide a bias potential tending to render said third valve conductive at the expiration of a predetermined time interval, a first impedance element associated with one of said pair of valves, circuit means responsive to the voltage across said first element and connected between said one main electrode and the other of said control electrodes of said third valve for applying a blocking bias to said third valve during conduction of said one valve, switch means regulated by the conductivity of said third valve and controlling current flow through said one valve and actuated to terminate current flow through said one valve solely as a consequence of the conductance of said third valve, a fourth and a fifth valve, each having main electrodes and a control electrode, circuit means responsive to the voltage across said first element and controlling the bias potential between said control electrode and one of said main electrodes of said fourth valve whereby said one valve acts to control the conductivity of said fourth valve, a second impedance element associated with the other of said pair of valves and including a primarily resistive portion and a primarily capacitive portion in series relationship, circuit means responsive to the voltage across said resistive portion and controlling the bias potential between said control electrode and one of said main electrodes of said fifth valve whereby said other valve controls the conductivity of said fifth valve, and circuit means responsive to the conductive conditions of said fourth and fifth valve for controlling both of said one control devices.

9. In a control circuit for controlling the flow of current to a load circuit from a source of polyphase alternating potential, a pair of terminals adapted to be energized from a source of unidirectional potential, a pair of electric discharge devices, each said device having main electrodes and a pair of control electrodes, circuit means including impedance elements connecting said main electrodes between said terminals, a pair of potential supplying devices having terminals, means connecting a first terminal of a first of said potential devices to one of said control electrodes of a first of said discharge devices, means connecting a first terminal of a second of said potential devices to one of said control electrodes of a second of said discharge devices, means including at least a portion of said circuit means for charging said potential devices with a potential, said second potential device being connected to one of said second discharge device main electrodes as a consequence of conduction of said first discharge device, said first potential device being connected to one of said first discharge device main electrodes as a consequence of conduction of said second discharge device, potential supplying means having a pulsating output potential in predetermined phase relationship to that of such source and connected between each of the other of said control electrodes of said discharge devices and said one main electrodes to render said discharge devices conductive solely during predetermined portions of the voltage wave of said source, a pair of valves for each of the phases of said source, each of said last-named valves having a pair of main electrodes and at least the valves of one of said pairs of valves having a control electrode, means responsive to the conductive condition of a first of each of said pairs of valves for controlling the flow of current in a first direction to said load from the phase of said source with which such first valve is respectively associated, means responsive to a conductive condition of said first valve of said one pair of valves for controlling the conductive condition of the remainder of said first valves, means responsive to the conductive condition of the second valve of each of said pair of valves for controlling the flow of current in a second direction to said load from the phase of said source with which such second valve is respectively associated, means responsive to a conductive condition of said second valve of said one pair of valves for controlling the conductive condition of the remainder of said second valves, and circuit means connected between said control electrode and one of said main electrodes of said first valve of said one pair and between said control electrode and one of said main electrodes of said second valve of said one pair, said last-named circuit means being controlled as a consequence of the potential appearing across certain of said impedance elements whereby said one pair of valves is controlled by said first and second discharge devices.

10. In an apparatus for supplying a load from an alternating current polyphase electrical source, a multi-vibrator network including a pair of impedance elements which are alternately energized and means operated in predetermined relationship to the source voltage wave to control the exact time of energization of one of said elements with respect to the wave of said source and means for determining the frequency at which said elements are energized, a first and second controlling network, each said controlling network including a valve having main electrodes and a controlling electrode and means for supplying an alternating potential between said main electrodes at a frequency equal to that of said polyphase source, means for applying a control potential derived from one of said alternately energized elements between said controlling electrode and one of said main electrodes of said valve of said first controlling network and for applying a control potential derived from the other of said alternately energized elements between said controlling electrode and one of said main electrodes of said first valve of said second controlling network whereby the current flow through said network first valves is controlled by said multi-vibrator network, means for regulating the supply of voltage to said one element independently of the supply to said other element, and a chargeable storage device in series connection with said other element and determining the time period during which a potential may exist across said other element.

11. In an apparatus for supplying a load from an alternating current polyphase electrical source, a multi-vibrator network including a pair of impedance elements which are alternately energized and means operated in predetermined phase relationship to the source voltage wave to control the exact time of energization of one of said elements with respect to the wave of said source and means for determining the frequency at which said elements are energized, a first and second controlling network, each said controlling network including a first and second valve having main electrodes and controlling electrodes and means for supplying an alternating potential between said main electrodes at a frequency equal to that of said polyphase source, each said controlling network including an electrical load in series with each of its respective said valves, means for applying a control potential derived from one of said alternately energized elements between said controlling electrode and one of said main electrodes of said first valve of said first controlling network and for applying a control potential derived from the other of said alternately energized elements between said controlling electrode and one of said main electrodes of said valve of said second controlling network whereby the current flow through said network first valves is controlled by said multi-vibrator network, each said controlling network including means for applying a control voltage derived from the voltage across the said load associated with said first valve between said controlling electrode and one of said main electrodes of said second valve, said last-named means including a source of alternating potential having a phase which is displaced in a leading direction from the phase of said alternating potential at an angle approximating 150 degrees.

12. In a control circuit for controlling the flow of current to a load circuit from a source of alternating potential, a pair of terminals adapted to be energized from a source of unidirectional potential, a first pair of valves having main electrodes and a pair of control electrodes, circuit means including impedance elements connecting said main electrodes between said terminals, a pair of potential supplying devices having terminals, means connecting a first terminal of a first of said devices to one of said control electrodes of a first of said valves, means connecting a first terminal of a second of said devices to one of said control electrodes of a second of said valves, means including at least a portion of said circuit means for charging said devices with a potential, said second device being connected to one of said second valve main electrodes as a consequence of conduction of said first valve, said first device being connected to one of said first valve main electrodes as a consequence of conduction of said second valve, potential supplying means having a pulsating output potential in predetermined phase relationship to that of such source and connected between each of the other of said control electrodes of said valves and said one main electrodes to render said valve conductive solely during a predetermined portion of the voltage wave of said source, a second pair of valves having main electrodes and a control electrode, a phase shifting circuit energized with a potential having a fixed phase relation to that of said source, circuit means connecting the output of said shifting circuit between said main electrodes of said second pair of valves, circuit means having a first output potential controlled as a function of a conductive condition of said first valve of said first pair and including time delay means for delaying the time of said output potential with respect to the time of conduction of said first valve, means for applying said first output potential between said control electrode and one of said main electrodes of a first valve of said second pair of valves, circuit means having a second output potential controlled as a function of the conductive condition of said second valve of said first pair and including time delay means for delaying the time of said last-named output potential with respect to the time of conduction of said second valve, means for applying said second output potential between said control electrode and one of said main electrodes of a second valve of said second pair of valves, and means responsive to the conductive condition of said second pair of valves for regulating the flow of current from said supply to said load circuit independently of flow of inductive current in said load circuit.

13. In an apparatus for supplying a load from an alternating current polyphase electrical source, a multi-vibrator network including a pair of impedance elements which are alternately energized and means synchronizing the time of energization of one of said elements with respect to the voltage wave of said source and means for determining the frequency at which said elements are energized; the combination of, two pair of valves, each of said pair including a first and a second valve having main electrodes and controlling electrodes, means for supplying an alternating potential between said main electrodes of each of said valves at a frequency equal to that of said polyphase source, each said first valve having an electrically operated timing device in series with its said main electrodes, each said timing device having an output circuit the change in potential of which is controlled at two timing rates depending upon the direction of the change in conductivity of the respective said first valve with which such timing device is associated, a first circuit means energized from one of said alternately energized elements and connected to apply a control potential between said controlling electrode and one of said main electrodes of said first valve of one of said pairs of valves, a second circuit means energized from the other of said alternately energized elements and connected to apply a control potential between said controlling electrode and one of said main electrodes of said first valve of the second of said pairs of valves whereby the current flow through said first valves is controlled by said multi-vibrator network, and means individually connecting said controlling electrode and one of said main electrodes of each of said second valves to the respective said output circuit of the said timing device which is actuated by the said first valve of the same set of valves.

14. In an apparatus for supplying a load from an alternating current polyphase electrical source, a multivibrator network including a pair of impedance elements which are alternately energized and means synchronizing the time of energization of one of said elements with respect to the voltage wave of said source and means for determining frequency at which said elements are energized; the combination of a first and second controlling network, each said controlling network including a normally conductive valve having main electrodes and a controlling electrode and a normally open switching device, each said device being operable to change the conductivity of an electric circuit at the end of a first predetermined time interval following a first change in conductivity of the respective said valve with which it is associated and to change the conductivity of the said circuit in a lesser predetermined time interval than said first interval following a second change in conductivity of said valve with which it is associated, a first circuit means energized by one of said alternately energized elements and connected to apply a control potential between said controlling electrode and one of said main electrodes of said valve of said first controlling network, a second circuit means energized by the other of said alternately energized elements and connected to apply a control potential between said controlling electrode and one of said main electrodes of said valve of said second controlling network whereby said switching devices are controlled in a desired timed relation with respect to changes in conductions of said multi-vibrator network.

15. In an apparatus for supplying a load from an alternating current polyphase electrical source, a multivibrator network including a pair of impedance elements which are alternately energized and means synchronizing the time of energization of one of said elements with respect to the voltage wave of said source and means for determining the frequency at which said elements are energized; the combination of two pair of valves, each said pair including a first and second valve having main electrodes and controlling electrodes, means for supplying an alternating potential between said main electrodes of each of said valves at a frequency equal to that of said polyphase source, a pair of time delay networks, each said delay network comprising an electrical energy storage device and a discharge circuit therefor, circuit means individually connecting said networks for charging of said devices as a consequence of the conduction of the respective said first valve with which it is associated, a first circuit means controlled by the potential across said storage device which is associated with said first valve of one of said pair of valves, said first circuit means being connected to apply a bias potential between said controlling electrode and one of said main electrodes of said second valve of said one pair of valves, a second circuit means controlled by the potential across said storage device which is associated with said first valve of the other of said pairs of valves, said second circuit means being connected to apply a bias potential between said controlling electrode and one of said main electrodes of said second valve of said other pair of valves.

16. In a network for supplying electrical energy to a load, a frequency timing network including a pair of alternately energized elements and means for determining the frequency of energization of said elements, an interpulse timing network including a pair of timing devices, a first circuit interconnecting one of said interpulse timing devices for actuation by one of said alternately energized elements of said frequency network, a second circuit interconnecting the other of said interpulse timing devices for actuation by the other of said alternately energized elements of said frequency network, a load current controlling network interconnecting such load to a source of electrical energy, said load current network including a first and a second asymmetric current conducting means, said first asymmetric means being connected to conduct current to such load in a first direction, said second asymmetric means being connected to conduct current to such load in a second direction, each of said asymmetric means including a control device for controlling its current conducting condition, a third circuit connecting said control device of said first asymmetric means to said one timing device of said interpulse timing network whereby the conductive condition of said first asymmetric means is controlled, a fourth circuit connecting said control device of said second asymmetric means to said other timing device of said interpulse timing network whereby the conductive condition of said second asymmetric means is controlled, each said timing device of said interpulse timing network having two timing intervals whereby the conduction of the respective said asymmetric means controlled thereby is responsive at a first time-rate with respect to an increasing degree of energization of said energized elements of said frequency timing network and at a second time-rate with respect to a decreasing degree of energization of said energized elements of said frequency timing network.

17. The combination of claim 16 in which such load is supplied from an alternating potential source, said frequency timing network includes means for synchronizing the change in energization of said alternately energized elements with the source of alternating potential, said timing intervals of said timing devices in said interpulse timing network being such that its time-rate interval for rendering its respectively associated said asymmetric device nonconductive is less than its time-rate for rendering its respectively associated said asymmetric device conductive.

18. The combination of claim 16 in which each said timing device of said interpulse timing network comprises a first and a second electric valve, each said valve having a pair of main electrodes and a control electrode and an anode circuit, said anode circuits associated with said first valves including a chargeable element and a discharge device for said element, said chargeable element being associated with its respective said anode circuit so that it is charged as a consequence of current flowing between the main electrodes of the said first valve with which it is associated, each said second valve having an anode circuit including an energizable means for controlling the respective said asymmetric means which is associated with the respective said timing device, each said timing device including a potential applying circuit having an output connected between said control electrode and one of said main electrodes of its respective second valve and having an input controlled by the potential appearing across its respective said chargeable element.

19. The combination of claim 18 in which each said timing device of said interpulse timing network is energized with an alternating potential and in which said first valves are polarized to conduct in opposite half cycles from their respective said second valve.

20. The combination of claim 18 in which at least each said second valve is of the discontinuous control type and is energized with an alternating potential, each said timing device includes a second bias potential connected to control the conduction of its respective said second valve, said second bias potential being phased with respect to said alternating potential which appears across said main electrodes such that it appears as a blocking bias potential throughout all of the time period that said alternating potential is of the correct polarity to cause conduction of said second valve except during a predetermined portion thereof.

21. The combination of claim 20 in which said predetermined portion is during the initial portion of said correct polarity.

22. In a network for supplying electrical energy to a load from a polyphase supply of alternating potential, a frequency timing network including a pair of alternately energized elements and means for determining the frequency of energization of said elements, an interpulse timing network including a pair of timing devices, a first circuit interconnecting one of said interpulse timing devices for actuation by one of said alternately energized elements of said frequency network, a second circuit interconnecting the other of said interpulse timing devices for actuation by the other of said alternately energized elements of said frequency network, a load current controlling network interconnecting such load to a source of electric energy, said load current network including a pair of asymmetric current controlling units connected between each of the phases of such alternating potential supply and such load, a first asymmetric unit of each of said pair of units being polarized to conduct current to such load in a first direction, a second asymmetric unit of each of said pair of units being polarized to conduct current to such load in a second direction, said load current controlling network further including a first and a second biasing means for controlling the conductive condition of each of said asymmetric units, a third circuit connecting said first biasing means to said one timing device of said interpulse timing network whereby the conductive condition of said first asymmetric unit is controlled in timed relationship to the energization of one of said alternately energized elements of said frequency timing network, a fourth circuit connecting said second biasing means to said other timing device whereby the conductive condition of said second asymmetric unit is controlled in timed relationship to the energization of the other of said alternately energized elements, each said timing device of said interpulse timing network having two timing intervals whereby the conduction of the respective said asymmetric means controlled thereby is responsive at a first time-rate with respect to an increasing degree of energization of said energized elements of said frequency timing network and at a second timerate with respect to a decreasing degree of energization of said energized elements of said frequency timing network.

23. The combination of claim 22 in which said first biasing means includes a control device individual to each of said first asymmetric units, said second biasing means includes a control device individual to each of said second asymmetric units, said third circuit is connected to the one of said first biasing means which is associated with the first-to-be-controlled of said first asymmetric units, means for causing sequential operation of each of said control devices of said first biasing means as a consequence of the operation of said first-to-be-controlled one of said control devices including a signal transmitting circuit interconnecting each said preceding one of said control devices of said first biasing means with the next succeeding one of said just-mentioned devices, said fourth circuit is connected to the one of said second biasing means which is associated with the first-to-be-controlled of said second asymmetric units, and means for causing sequential operation of each of said control devices of said second biasing means as a consequence of the operation of said first-to-be-controlled one of said control devices in said second biasing means including a signal transmitting circuit interconnecting each said preceding one of said control devices of said second biasing means with the next succeeding one of said just-mentioned devices.

24. The combination of claim 23 in which said biasing means control devices comprise electric discharge devices having anode circuits including energizable devices, a polyphase phase shifting circuit connected to supply potential to said anode circuits whereby the time in the supply voltage waves at which said asymmetric units conduct may be determined.

25. The combination of claim 24 in which said signal transmitting circuits are energized by respective ones of said anode circuit energizable devices.

26. In an apparatus controlling the flow of electrical energy, a sequencing network including a first and a second energizable device, an electrical energy flow controlling network including at least one pair of normally nonconductive asymmetric current controlling devices connected in back-to-back relation between a source of electrical energy and a load, said second energizable device including an electric valve having a pair of main electrodes and a pair of controlling electrodes, a timing means having an output potential circuit connected between one of said controlling electrodes and one of said main electrodes and normally maintaining a bias potential therebetween for holding said valve nonconductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control the conductive periods of said asymmetric devices and operable to alternately render said asymmetric devices in a conducting condition, and a bias potential circuit connected between the other said controlling electrodes and said one main electrode for applying a blocking bias potential to said valve during periods of conduction of one of said asymmetric controlling devices.

27. In an apparatus controlling the flow of electrical energy, a sequencing network including a first and a second energizable device, an electrical energy flow controlling network controlling flow of energy in each of two directions between a source of electrical energy and a load, said second device including an electric valve having a pair of main electrodes and a pair of controlling electrodes, a timing means having an output potential circuit connected between one of said controlling electrodes and one of said main electrodes and normally maintaining a bias potential therebetween for holding said valve nonconductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control said energy flow controlling network and operable to alternately actuate the same to provide for an alternating flow of current between said source and said load, and a bias potential circuit connected between the other said controlling electrodes and said one main electrode for applying a blocking bias potential to said valve during flows of current between said load and said source in one direction.

28. In an apparatus controlling the flow of electrical energy, a sequencing network including a first and a second energizable device, an electrical energy flow controlling network controlling flow of energy in each of two directions between a source of electrical energy and a load, said second device including an electric valve having a pair of main electrodes and a conductivity controlling means, a timing means having an output potential circuit connected between said valve conductivity controlling means and one of said main electrodes and normally maintaining a bias potential therebetween for holding said valve nonconductive, means operatively connecting said timing means to said first energizable device whereby said timing means is actuatable in response to a change in the energized condition of said first energizable device to remove said blocking bias potential at a desired time interval subsequent to actuation of said first energizable device, an output frequency timing device having an output network connected to control said energy flow controlling network and operable to alternately actuate the same to provide for an alternating flow of current between said source and said load, and a bias potential circuit connected between said valve conductivity controlling means and said one main electrode for applying a blocking bias potential to said valve during flows of current between said load and said source in one direction.

29. The combination of claim 28 in which an alternating potential is placed across said main electrodes, and a third bias potential is applied between said conductivity controlling means and one of said main electrodes, said third bias potential being phased with respect to said alternating potential which is applied to said main electrodes so that said valve is biased nonconductive at all times when the polarity of said main electrodes is correct for conduction of said valve, except during a predetermined selected portion of such time.

30. In an electrical controlling apparatus for supplying an electrical load from a source of alternating electrical energy, an output frequency determining network including a pair of electric discharge devices arranged to conduct alternately in timed frequency, an interpulse timing network comprising two sets of electric valves and two timing devices, each said set of valves including a first and second valve, each said valve having a pair of main electrodes and a control electrode, means connecting a first of said timing devices to respond to changes in current flow between said main electrodes of said first valve of one of said sets of valves, said first timing device having an output circuit connected between said control electrode and one of said main electrodes of said second valve of said one set of valves, means connecting a second of said timing devices to respond to changes in current flow between said main electrodes of said first valve of the other of said sets of valves, said second timing device having an output circuit connected between said control electrode and one of said main electrodes of said second valve of said other set of valves, each said timing device being operable to change the potential of its output circuit in timed relation to a change in current flow through the respective said first valve with which it is associated, circuit means controlled by said frequency determining network for rendering respective first valves of said two sets of valves alternately conductive and nonconductive in timed relation to the alternate conduction of said discharge devices of said frequency determining network, a pair of unidirectional current conducting means, means responsive to the current flow between said main electrodes of said second valve of said one set for controlling the conductive condition of one of said unidirectional conducting means, and circuit means responsive to the current flow between said main electrodes of said second valve of said other set for controlling the conductive condition of the other of said undirectional means.

31. In an electrical controlling apparatus for supplying an electrical load from a source of alternating electrical energy, an output frequency determining network including a multi-vibrator having a pair of thyratronic valves and means to cause said valves to conduct alternately in timed frequency, said network also including a switch for interrupting the circuit to one of said valves and means for rendering one of said valves conductive at a first desired point in one half cycle of the voltage wave of said source and for rendering the other of said valves conductive at a second desired point in the other half cycle of the voltage wave of said source, an interpulse timing network comprising two sets of electric valves and two timing devices, each said set of valves including a first and second valve, each said valve of said interpulse network having an anode and a cathode and a control electrode, means supplying an alternating potential between said anode and cathode of said valves of said interpulse network and polarized so that said anode of said first valve of a first of said set of valves is negative with respect to its cathode at the instant of said first desired point in said frequency network and the anode of said first valve of a second of said sets of valves is negative with respect to its cathode at the instant of said second desired point in said frequency network, means connecting said control electrode and said cathode of said first valve of said first set of valves to said frequency network so that said first set of valves responds to changes in current flow through said one valve of said frequency network, means connecting said control electrode and said cathode of said first valve of said second set of valves to said frequency network so that said second set of valves responds to changes in current flow through said other valve of said frequency network, a first of said timing devices being connected to respond to changes in conductivity of said first valve of said first set and having an output potential circuit connected between said cathode and said control electrode of said second valve of said first set, a second of said timing devices being connected to respond to changes in conductivity of said first valve of said second set and having an output potential circuit connected between said cathode and said control electrode of said second valve of said second set, each said timing device being operable to change the potential of its output circuit in timed relation to a change in current flow through the respective said first valve with which it is associated, a pair of unidirectional current conducting means, means responsive to the current flow between said main electrodes of said second valve of said one set for controlling the conductive condition of one of said unidirectional conducting means, and circuit means responsive to the current flow between said main electrodes of said second valve of said other set for controlling the conductivity of the other said unidirectional means.

32. In an apparatus for supplying a single phase load from a polyphase alternating current source, a first pair of potential supplying terminals adapted to be supplied from a source of unidirectional electrical potential, a first and a second electric discharge device, each said device having a pair of main electrodes and a control means, a first and a second impedance means, a first circuit connecting said first impedance means and said main electrodes of said first device in series circuit between said pair of terminals, a second circuit connecting said second impedance means and said main electrodes of said second device in series between said pair of terminals, a third and a fourth electric discharge device, each said third and said fourth device having a pair of main electrodes and a control means, a first and a second controlling network, each said network having a pair of input terminals and a pair of output terminals, means connecting said input terminals of said first network across said first impedance means and said output terminals of said first network between one of said main electrodes and said control means of said third device, means connecting said input terminals of said second network across said second impedance means and said output terminals of said second network between one of said main electrodes and said control means of said fourth discharge device, said first and second impedance means acting as a consequence of a change in the potential drop thereacross to change the output potential of the respective said network with which it is associated, a triad of potential supplying terminals adapted to be energized from a source of alternating potential of the same frequency as said source, said triad of terminals being arranged so that the potential between a first and a second of said triad of terminals has a 180 degree phase relation with the potential appearing between said first and a third of said triad of terminals, a third and fourth impedance means, a third circuit connecting said main electrodes of said third device and said third impedance means in series between said first and said second of said triad of terminals, a fourth circuit connecting said main electrodes of said fourth device and said fourth impedance means in series between said first and said third of said triad of terminals, a pair of anti-parallel connected electric discharge devices for each of the phases of said source, each device of each said pair of devices including a control means and a main electrode, a third network having a pair of input terminals connected to respond to the potential appearing across said third impedance means and having a plurality of pairs of output terminals, said pairs of said last-named output terminals being individually connected between said control means and said main electrode of a first of each of said pairs of devices, a fourth network having a pair of input terminals connected to respond to the potential appearing across said fourth impedance means and having a plurality of pairs of output terminals, said pairs of said last-named output terminals being individually connected between said control means and said main electrode of a second of each of said pairs of devices.

33. The combination of claim 32 in which said first and said second networks comprise relay devices which are actuated as a consequence of the energization of the one of said first and second impedance with which it is associated to control the potential between said output terminals of the one of said first and second network with which it is associated to render the respective said third or fourth discharge device conductive.

34. The combination of claim 33 in which said relay devices are electric discharge devices each having time delay impedance networks in their anode circuits.

35. The combination of claim 32 in which there is provided means common to each of said first and second devices for rendering said first and second devices conductive solely at predetermined times in the voltage wave of said source.

36. In a control circuit for controlling the flow of current to a load circuit from a source of alternating potential, a pair of terminals adapted to be energized from a source of unidirectional potential, a pair of valves having main electrodes and a pair of control electrodes, circuit means including impedance elements connecting said main electrodes between said terminals, a pair of potential supplying devices having terminals, means connecting a first terminal of a first of said devices to one of said control electrodes of a first of said valves, means connecting a first terminal of a second of said devices to one of said control electrodes of a second of said valves, means including at least a portion of said circuit means for charging said devices with a potential, said second device being connected to one of said second valve main electrodes as a consequence of conduction of said first valve, said first device being connected to one of said first valve main electrodes as a consequence of conduction of said second valve, potential supplying means having a pulsating output voltage maintained in predetermined phase relationship to that of such source and connected between each of the other of said control electrodes of said valves and said one main electrodes to render said valve conductive solely during a predetermined portion of the voltage wave of said source, and means responsive to the conductive condition of said valves for controlling the flow of energy from such source to such load.

37. In a frequency converting system, a pair of electric valves, circuit means for controlling the conductivity of said valves in alternating relation, control means for discontinuing the alternating operation of said valve with one of said valves in a conducting condition, an impedance network, means connected to said one valve for applying across said network a potential which varies as a function of the conductive condition of only said one of said valves, said network comprising a primarily resistive portion serially connected with a primarily reactive portion whereby the potential across said resistive portion will be a function of the current flowing to said reactive portion.

38. In a frequency converting system, a pair of electric valves, circuit means for controlling the conductivity of said valves in alternating relation, control means for discontinuing the alternating operation of said valves with one of said valves in a conducting condition, an impedance network, means connected to said one valve for applying across said network a potential which varies as a function of the conductive condition of only said one of said valves, said network comprising a pair of series connected impedance elements, one of said elements being a capacitor whereby the potential across the other of said elements will be a function of the charging current flowing to said capacitor.

39. In a frequency converting system for association with a source of alternating potential, a pair of discontinuous control type electric valves, a capacitor, means connecting said capacitor for inverter operation of said valves, means for synchronizing the firing of said valves with the source of alternating potential, time control means for causing inverter operation of said valves, time control means for stopping said inverter operation with one of said valves in a nonconducting condition, an impedance network comprising a resistive portion and a reactive portion, and means effective upon continued conduction of only the other of said valves for charging said reactive portion and for reducing the potential across said resistive portion comprising means for connecting said impedance network in series with said other of said valves.

40. In a frequency converting system for association with a source of alternate potential, a pair of discontinuous control type electric valves, a capacitor, means connecting said capacitor for inverter operation of said valves, means for synchronizing the firing of said valves with the source of alternating potential, time control means for causing inverter operation of said valves, time control means for stopping said inverter operation with one of said valves in a nonconducting condition, an impedance network comprising a series connected resistor and capacitor, and means effective upon continued conduction of the other valve for charging said capacitor and for reducing the potential across said resistor comprising means for connecting said impedance network in series with said other of said valves.

41. The combination of claim 40 further including an asymmetric current conducting device connected to discharge said capacitor.

42. In a frequency controlling network, a first and second electric valve, each said valve having an anode and a cathode and a controlling electrode, a pair of busses adapted to be energized from a source of unidirectional electric potential whereby one of said busses is maintained at a positive potential with respect to the other of said busses, a first impedance element connected between said one bus and said first valve anode, a second impedance element connected between said one bus and said second valve anode, conducting means connecting each of said cathodes to said other bus, a first and second electrical energy storage device, each said device having a first and second terminal, means connecting said first device first terminal to said first valve control electrode, means connecting said second device first terminal to said second valve control electrode, means connecting said first device second terminal to said second valve anode, means connecting said second device second terminal to said first valve anode, a third impedance device including a reactive portion and a resistive portion, said third device being connected in parallel with said second element and having a potential thereacross which is proportional to that across said second element, means controlling the passage of current through said one valve, means providing a discharge circuit for each of said storage devices, and a unidirectional current controlling device connected in parallel with said resistive portion, said unidirectional device being polarized to permit the discharging of said reactive portion.

43. In a device for transferring unipotential increments of electrical energy from a multiphase source to a load in which said increments are of a duration greater than a half period of said source comprising, at least one electric discharge apparatus interposed between the load and each phase of the source and polarized to transmit current of the same polarity, a control network for determining the conductivity of said discharge apparatus, a first time controlling said control network and operable to determine the length of said increments, and a second timer actuated as a consequence of the initiation of a timing interval by said first timer and connected to delay the initiation of operation of said control network for a predetermined interval after the initiation of said timing interval by sad first timer, said last named interval being not less than a half period of said source.

44. In a device for transferring increments of electrical energy from a multiphase source to a load in which said increments are of a duration greater than a half period of said source comprising, at least one electric discharge apparatus interposed between the load and each phase of the source and polarized to transmit current of the same polarity, a contrtol network for determining the conductivity of said discharge apparatus, a first timer including a first time delay impedance network operable to determine the length of said increments, a second timer including a second time delay impedance network actuated to measure a time interval as a consequence of the initiation of a timing interval by said first timer, circuit means interconnecting said second delay network and said control network for rendering said control network effective to render said discharge apparatus conducting as a consequence of the timing out of said second delay network, and means actuated as a consequence of the timing out of said first delay network to render said control network effective to terminate the conduction of said discharge apparatus.

45. In a timing apparatus, a first electric valve having a pair of main electrodes, a first impedance means connected in series with said main electrodes, a second electric valve having a pair of electrodes, a first reactive timing network connected in series with said electrodes of said second valve, a third electric valve having a pair of electrodes, a second reactive timing network connected in series with said electrodes of said third valve, a fourth electric valve having a pair of main electrodes and a control means for controlling current flow between its said pair of main electrodes, means responsive to the energization of said first impedance means to terminate further energy flow to said first timing network whereby said first timing network commences to time out and for rendering said third valve effective to terminate further energy flow to said second timing network whereby said second timing network commences to time out, and means responsive to the timing out of said second timing network for rendering said fourth valve conducting, said first timing network having a greater timing interval than said second timing network and operable upon timing out to establish a blocking bias potential between said control means and one of said pairs of main electrodes of said fourth valve to terminate the conductive period of said fourth valve.

46. In a device for transferring unipotential increments of electrical energy from a multiphase source to a load in which the increments are of a duration greater than a half period of the source comprising at least one electric discharge apparatus interposed between the load and each phase of the source and polarized to transmit current of the same polarity; a control network for determining the conductivity of said discharge apparatus; a first timing means for producing a timing interval for controlling said control network and operable to determine the length of the increments comprising a pair of terminals adapted to be energized from a source of unidirectional potential, a pair of valves having main electrodes and a pair of control electrodes, circuit means including impedance elements connecting said main electrodes between said terminals, a pair of potential supplying devices having terminals, means connecting a first terminal of a first of said devices to one of said control electrodes of a first of said valves, means connecting a first terminal of a second of said devices to one of said control electrodes of a second of said valves, means including at least a portion of said circuit means for charging said devices with a potential, said second device being connected to one of said second valve main electrodes as a consequence of conduction of said first valve, said first device being connected to one of said first valve main electrodes as a consequence of conduction of said second valve, and potential supplying means having a pulsating output voltage maintained in predetermined phase relationship to that of the multiphase source and connected between each of the other of said control electrodes of said valves and said one main electrodes to render said valve conductive solely during a predetermined portion of the voltage wave of the multiphase source; and a second timing means actuated as a consequence of the initiation of the timing interval by said first timing means and connected to delay the initiation of operation of said control network for a predetermined interval after the initiation of the timing interval by said first timing means, the delay time interval being not less than a half period of the multiphase source.

47. In an apparatus for supplying a load from an alternating current polyphase electrical source, a multi-vibrator network including a pair of terminals adapted to be energized from a source of unidirectional potential, a pair of valves having main electrodes and a pair of control electrodes, circuit means including impedance means connecting said main electrodes between said terminals, a pair of potential supplying devices having terminals, means connecting a first terminal of a first of said devices to one of said control electrodes of one of said valves, means connecting a first terminal of a second of said devices to one of said control electrodes of the other of said valves, means including at least a portion of said circuit means for charging said devices with a potential, said second device being connected to one of said other valve main electrodes as a consequence of conduction of said one valve, said first device being connected to one of said one valve main electrodes as a consequence of conduction of said other valve, and potential supplying means having a pulsating output voltage maintained in predetermined phase relationship to that of the polyphase source and connected between each of the other of said control electrodes of said valves and said one main electrodes to render said valve conductive solely during a predetermined portion of the voltage wave of the multiphase source, said impedance means including impedance elements individual to and alternately energized by said one and said other valve; a first and second controlling network, each said controlling network including a first and second valve having main electrodes and controlling electrodes and means for supplying an alternating potential between said main electrodes at a frequency equal to that of the polyphase source, each said controlling network including an electrical load in series with each of its respective said valves, means for applying a control potential derived from one of said alternately energized elements between said controlling electrode and one of said electrodes of said first valve of said first controlling network and for applying a control potential derived from the other of said alternately energized elements between said controlling electrode and one of said main electrodes of said valve of said second controlling network whereby the current flow through said network first valves is controlled by said multi-vibrator network, each said controlling network including means for applying a control voltage derived from the voltage across the said load associated with said first valve between said controlling electrode and one of said main electrodes of said second valve, said last-named means including a source of alternating potential having a phase which is displaced in a leading direction from the phase of said alternating potential at an angle approximating 150 degrees.

48. In a device for transferring unipotential increments of electrical energy from a multiphase source to a load in which the increments are of a duration greater than a half period of the source comprising, at least one electric discharge apparatus interposed between the load and each phase of the source and polarized to transmit current of the same polarity, a control network for determining the conductivity of said discharge apparatus, a first timing means controlling said control network and operable to determine the length of said increments comprising a pair of impedance elements which are alternately energized and means operated in predetermined phase relationship to the source voltage wave to control the exact time of energization of one of said elements with respect to the wave of the source and means for determining the frequency at which said elements are energized, a second timing means actuated as a consequence of the initiation of the timing interval by said first timing means and connected to delay the initiation of operation of said control network for a predetermined interval after the initiation of the timing interval by said first timing means comprising a first and second controlling network, each said controlling network including a first and second valve having main electrodes and controlling electrodes and means for supplying an alternating potential between said main electrodes at a frequency equal to that of the multiphase source, each said controlling network including an electrical load in series with each of its respective said valves, means for applying a control potential derived from one of said alternately energized elements between said controlling electrode and one of said main electrodes of said first valve of said first controlling network and for applying a control potential derived from the other of said alternately energized elements between said controlling electrode and one of said main electrodes of said valve of said second controlling network whereby the current flow through said controlling networks first valves is controlled by said first timing means, each said controlling network including means for applying a control voltage derived from the voltage across the said load associated with said first valve between said controlling electrode and one of said main electrodes of said second valve, said last-named means including a source of alternating potential having a phase which is displaced in a leading direction from the phase of the multiphase source at an angle approximating 150 degrees, the delay time interval by said second timing means being not less than a half period of the multiphase source.

49. Apparatus for controlling the transfer of pulses of increments of electrical current of first one polarity and then an opposite polarity from a polyphase source to a single phase welder comprising a first timing means for producing a first signal of a preselected duration, second timing means commencing concurrently with said first signal for producing a second signal having a duration less than said preselected duration for providing a delay in the initiation of a pulse of one polarity after the termination of a pulse of an opposite polarity with said duration of said second signal being not less than a half period of one phase of the polyphase source, current controlling means electrically associated with each phase of the source and effective while actuated to transmit currents of one polarity to the welder, and means responsive to the termination of said second signal for actuating said current controlling means and responsive to the termination of said first signal for deactuating said current controlling means said first timing means comprising a first electrical energy storage device for providing said first signal, said second timing means comprising a second electrical energy storage device for providing said second signal.

50. The combination of claim 49 with said second timing means commencing in response to the initiation of said first signal.

51. In combination, a source of signals of a preselected frequency, and a triggered multi-vibrator circuit for producing output signals of a frequency low relative to said preselected frequency comprising a pair of valve means each having input and output circuits, time-delay coupling means coupling the output circuit of each of said valve means to each of the input circuits of the other valve means, the time constant of said time-delay coupling means for each of said valve means being long relative to the period of said signals of preselected frequency, and means connected to said source for applying triggering signals to said triggered multi-vibrator in timed relation to the signals from said source.

52. The combination of claim 51 further including a load resistor in the output circuit of one of said valve means, and circuit means including reactive and resistive elements connected in parallel with said load resistor, and signal conductive means connected to said circuit means which varies with time from the voltage appearing across said load resistor.

References Cited by the Examiner
UNITED STATES PATENTS

| | | | |
|---|---|---|---|
| 2,070,647 | 2/1937 | Braaten | 331—144 |
| 2,248,975 | 7/1941 | Faudel | 331—144 |
| 2,361,845 | 10/1944 | Hutchins | 323—24 |
| 2,370,287 | 2/1945 | Bivens | 323—24 |
| 2,422,449 | 6/1947 | Usselman | 331—144 |
| 2,426,996 | 9/1947 | Goodall | 331—144 |
| 2,431,083 | 11/1947 | Sciaky | 321—7 |
| 2,445,448 | 7/1948 | Miller | 331—144 |
| 2,459,723 | 1/1949 | Schantz | 331—144 |
| 2,549,831 | 4/1951 | Longini | 321—7 |
| 2,603,751 | 7/1952 | Miller | 331—144 |
| 2,614,240 | 10/1952 | Bivens | 321—7 |
| 2,619,625 | 11/1952 | Parsons | 321—7 |
| 2,689,323 | 9/1954 | Diamond et al. | 321—7 |
| 2,853,672 | 9/1958 | Parsons | 321—7 |

LLOYD McCOLLUM, *Primary Examiner.*

SAMUEL BERNSTEIN, *Examiner.*